US012710333B2

(12) United States Patent
Genta et al.

(10) Patent No.: US 12,710,333 B2
(45) Date of Patent: Aug. 18, 2026

(54) VALVE DIAGNOSTIC AND PERFORMANCE SYSTEM

(71) Applicant: Saudi Arabian Oil Company, Dhahran (SA)

(72) Inventors: Pablo Daniel Genta, Dhahran (SA); Essam Ahmed Al-Arfaj, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 309 days.

(21) Appl. No.: 18/197,565

(22) Filed: May 15, 2023

(65) Prior Publication Data

US 2023/0304886 A1 Sep. 28, 2023

Related U.S. Application Data

(62) Division of application No. 17/061,361, filed on Oct. 1, 2020, now Pat. No. 11,692,903.

(51) Int. Cl.

| | |
|---|---|
| ***G01M 3/28*** | (2006.01) |
| ***F16K 5/06*** | (2006.01) |
| ***F16K 37/00*** | (2006.01) |
| ***G01M 3/00*** | (2006.01) |
| ***G01M 3/04*** | (2006.01) |

(52) U.S. Cl.

CPC ............. *G01M 3/2876* (2013.01); *F16K 5/06* (2013.01); *F16K 37/0058* (2013.01); *F16K 37/0066* (2013.01); *G01M 3/002* (2013.01); *G01M 3/04* (2013.01)

(58) Field of Classification Search

CPC ...... G01M 3/2876; G01M 3/002; G01M 3/04; F16K 5/06; F16K 37/0058; F16K 37/0066

See application file for complete search history.

(56) References Cited

U.S. PATENT DOCUMENTS

| | | | |
|---|---|---|---|
| 4,453,420 | A | 6/1984 | Nakane et al. |
| 4,976,144 | A | 12/1990 | Fitzgerald |
| 4,984,474 | A | 1/1991 | Matsushima et al. |
| 5,197,328 | A | 3/1993 | Fitzgerald |

(Continued)

FOREIGN PATENT DOCUMENTS

| | | |
|---|---|---|
| CN | 202835323 | 3/2013 |
| CN | 205940886 U * | 2/2017 |

(Continued)

OTHER PUBLICATIONS

U.S. Appl. No. 17/061,189, filed Oct. 1, 2020, Genta et al.

(Continued)

*Primary Examiner* — Angelisa L. Hicks

(74) *Attorney, Agent, or Firm* — Fish & Richardson P.C.

(57) ABSTRACT

A multi-piece ball valve includes a body, a first closure piece attached to the body, the first closure piece and the body together defining an interior cavity. A ball is disposed in the interior cavity, the ball defining a bore extending through the ball. A load sensor ring is disposed in an annular cavity defined in an outer surface of the body between the body and the first closure piece. A pressure sensor is operable to sense fluid pressure between the body and the first closure piece. An electronic control system is in communication with the load sensor ring and the pressure sensor.

13 Claims, 23 Drawing Sheets

(56) References Cited

U.S. PATENT DOCUMENTS

| | | | |
|---|---|---|---|
| 5,272,647 | A | 12/1993 | Hayes |
| 5,329,465 | A | 7/1994 | Arcella et al. |
| 5,549,137 | A | 8/1996 | Lenz et al. |
| 5,748,469 | A | 5/1998 | Pyotsia |
| 6,131,609 | A | 10/2000 | Metso et al. |
| 6,564,825 | B2 | 5/2003 | Lowery et al. |
| 6,729,433 | B2 | 5/2004 | Uryu et al. |
| 6,910,391 | B1 | 6/2005 | May |
| 7,021,160 | B2 | 4/2006 | Pattok et al. |
| 7,051,760 | B1 | 5/2006 | Beamer et al. |
| 7,845,243 | B2 | 12/2010 | Poirier et al. |
| 7,940,189 | B2 | 5/2011 | Brown |
| 8,425,683 | B2 | 4/2013 | Yang et al. |
| 8,768,631 | B2 | 7/2014 | Wilke |
| 8,838,413 | B2 | 9/2014 | Genta |
| 8,850,880 | B2 | 10/2014 | Püttmer |
| 8,890,514 | B2 | 11/2014 | Masson et al. |
| 10,317,718 | B2 | 6/2019 | Ihalainen et al. |
| 10,344,782 | B2 | 7/2019 | Penning et al. |
| 10,429,427 | B2 | 10/2019 | Fink et al. |
| 11,692,903 | B2 | 7/2023 | Genta et al. |
| 2005/0066709 | A1 | 3/2005 | Zachary et al. |
| 2006/0272710 | A1 | 12/2006 | Minervini et al. |
| 2006/0279279 | A1 | 12/2006 | Foley |
| 2008/0099404 | A1 | 5/2008 | Markham et al. |
| 2011/0005303 | A1* | 1/2011 | Izumo ................ G01M 3/2815 385/13 |
| 2012/0199765 | A1* | 8/2012 | Hilzendegen ........... F15B 11/05 137/596.14 |
| 2013/0110418 | A1 | 5/2013 | Nousiainen |
| 2013/0147466 | A1 | 6/2013 | Baek et al. |
| 2014/0176344 | A1 | 6/2014 | Littlestar et al. |
| 2015/0082888 | A1 | 3/2015 | Otsu et al. |
| 2018/0051824 | A1 | 2/2018 | Arcelaschi et al. |
| 2019/0146043 | A1 | 5/2019 | Calisch et al. |
| 2022/0107032 | A1 | 4/2022 | Genta et al. |
| 2022/0107034 | A1 | 4/2022 | Genta et al. |

FOREIGN PATENT DOCUMENTS

| | | |
|---|---|---|
| CN | 105508645 | 7/2018 |
| CN | 110735943 | 1/2020 |
| DE | 102006033931 | 1/2008 |
| EP | 0315391 | 4/1994 |
| EP | 1470870 | 10/2004 |
| JP | H05209798 A * | 8/1993 |
| KR | 20120004423 | 6/2012 |
| WO | WO 9900619 | 1/1999 |
| WO | WO 0006933 | 2/2000 |
| WO | WO 0216188 | 2/2002 |
| WO | WO 2015020986 | 2/2015 |
| WO | WO 2015153106 | 10/2015 |
| WO | WO 2015181609 | 12/2015 |

OTHER PUBLICATIONS

U.S. Appl. No. 17/061,384, filed Oct. 1, 2020, Genta et al.

PCT International Search Report and Written Opinion in International Appln. No. PCT/US2021/052867, dated Jan. 21, 2022, 14 pages.

PCT International Invitation to Pay Additional Fees and, Where Applicable, Protest Fees in International Appln No. PCT/US2021/053062, dated Jan. 19, 2022, 13 pages.

PCT International Invitation to Pay Additional Fees and, Where Applicable, Protest Fees in International Appln No. PCT/US2021/052952, dated Jan. 21, 2022, 14 pages.

PCT International Search Report and Written Opinion in International Appln. PCT/US2021/053062, dated Mar. 15, 2022, 20 pages.

PCT International Search Report and Written Opinion in International Appln. PCT/US2021/052952, dated Mar. 16, 2022, 23 pages.

* cited by examiner

VALVE DIAGNOSTIC AND PERFORMANCE SYSTEM

CROSS REFERENCE TO RELATED APPLICATION

This application is a divisional of and claims priority to U.S. patent application Ser. No. 17/061,361, filed on Oct. 1, 2020, the entire contents of which is incorporated by reference herein.

TECHNICAL FIELD

The present disclosure generally relates to a diagnostic and performance monitoring system for ball valves, particularly for detecting malfunction and component failures.

BACKGROUND

Valves regulate the flow of a fluid (gases, fluidized solids, slurries, or liquids) by opening, closing, or partially obstructing various passageways. The valve has two or more ports which allow the flow of the fluid into and out of the valve. It includes a valve body that houses a valve member which interfaces with a valve seat. It is formed along the interior surface of the valve body to form a leak-tight seal when the valve member is fully closed. The valve member is attached to or contacts a valve stem which is used to transmit motion to control the position of the internal valve member with respect to the valve seat. External to the valve body, the stem is attached to a handle or other control device.

Isolation valves are an integral part of many industrial plants. There are four fundamental valve designs: globe valves, ball valves, butterfly valves, and gate valves. Valve performance is important through the system lifespan and to ensure plant efficiency.

SUMMARY

This specification describes valves that include diagnostic and performance monitoring system that can be used, for example, for industrial plant isolation valves. The configuration of these diagnostic and performance monitoring system generally increase ease of maintenance and access for split-body valves. These systems quantitatively detect and measure on-stem valve torque and position, the flowrate of the valve seat, valve stem packing leaks, valve body-closure joint leaks, pipeline pig (scraper) position inside the valve, and valve performance deviations against original specified conditions. The system also monitors performance of preventive maintenance procedures and locates the damaged and misaligned seats of the valve. The system is equipped with a local data-logging device, a logic solver, and remotely readable tags for recording valve design and evaluating performance data and performance deviation. The term "logic solver" is used conventionally to indicate a hardware device or a software system whose inputs and outputs are connected to safety critical devices.

The system comprises sensors connected and inserted into the valve body, a controller for valve seat leak measurement, a communication device, and an interface electrical housing. The interface electrical housing hosts a diagnostic logic solver. The logic solver features a non-volatile memory, an internal power pack connection for external power sources, and communication ports. The system of the present disclosure includes a seat leak flow apparatus which determines the leaking valve seat and computes the leak flow-rate compensated for temperature and pressure.

The system detects valve body leaks for ball valves assembled in one or more body pieces, either soft-seated or metal seated. The monitoring system can be integrated into ball valves, welded body type, split-body, top entry, and three-piece type valves. The system can diagnose, measure and detect problems to assess the overall physical condition of the valve seats, presence of fluids in the valve cavities between the trim and the body, actual position of the valve trim against valve openings and alignment of seats against the valve bore. The system enables locating a pipeline pig device while it travels across the isolation valve. Sometimes during pipeline scraping, a pig passing the valve bore is trapped and causes damages to the valve seat. If the pig is not equipped with signalers, the pig location may remain unknown until an inspection of the valve is performed.

The monitoring system detects and measures stem packing leaks. They are measured by a single built-in apparatus machined into an interface flange between the valve gland and the valve-actuator measuring the leak-flow profile within the packing. The monitoring system detects and locates seat damages in order to assess valve condition prior to installation. The technology has the ability to provide specific assemblies in order to isolate electrical sensors built inside the valve inner parts from the atmosphere.

The monitoring system includes non-intrusive sensors mounted on each piece of the valve closure inside the valve body. The sensors locate the pig passage and send a signal to the logic solver. The logic server estimates the position of the pig to prevent a trapping inside the valve. The logic solver compares the arrival time of the pig at the inlet and at the outlet closure pieces of the valve. When a signal is detected on one closure piece it is also detected on another closure piece.

The monitoring system includes integrated device to detect and locate a joint-leak and a flange bolting condition for ball valves designed with two or more piece assembly (e.g. split-body, top-entry). This apparatus consists of a voltage-free sensitive fiber optic cable inserted into a groove. The groove is machined on the joint face of the valve body. The fiber detects and locates mechanical stress caused by imbalance in a bolting torque. The fiber is also able to detect presence of the fluid escaping the body. Reflectometry routine operating in the logic solver allows the fiber to detect the specified parameters. In some implementations, one or more fibers are integrated into a mechanical conduit machined in the bottom plate of the valve ball. Some fibers are dedicated to measuring local stress and other fibers are dedicated to detect fluid.

The monitoring system includes an apparatus to detect floating seat alignment with respect to the valve body. This apparatus consists of a voltage-free fiber sensor inserted into a groove into the seat body. Any misalignment of the floating seat element with respect to the body seat part will be detected by the fiber through the reflectometry routine running in the logic solver.

The monitoring system includes a capillary pressure sensor and isolation assemblies for detecting fluid joint leaks at the valve body-closure piece.

The monitoring system includes a seat leak flow-rate apparatus and a controller. The apparatus provides a plurality of calibrated orifices isolated by solenoid valves and governed by the controller. In some implementations, the logic solver runs the controller routine. The controller executes a pre-determined routine to automatically select the orifice used for flow measurement. The execution is performed by switching between a larger or a smaller orifice run when out-of-range conditions are detected. The controller receives the differential pressure reading across the selected orifice in order to compute the leak flow compensated for temperature and pressure.

The monitoring system includes a valve main cable pressure tight assembly. It allows the inner valve sensors to safely connect to the outside environment with three levels of sealing. The three levels include a cable male connector plug which isolates the inside sensor, cables with outside electrical conduit, a back seal of the female connector which provides sealing in full retrieved position, and a pipe-tee packing neck which provides fluid sealing in case of damage of the connector plug during operation. The valve main cable pressure tight assembly further provides an isolation valve to allow full isolation in the case of a plug damage.

In some aspects, a seat leak measurement system for a ball valve, the system includes: a ball valve with a cavity drain line controlled by a cavity drain valve and a valve sensor retrieval fitting, the ball valve comprising a cavity pressure sensor; a valve seat leak measurement apparatus including: a cable with a connector compatible with the valve sensor retrieval fitting, the connector having an external grounding cable to ground the apparatus to a valve body ground terminal; an apparatus electronic control system in communication with the valve sensor retrieval fitting and with valves of the valve seat leak measurement apparatus; an fluid inlet line with a quick pipe coupler, the fluid inlet line having an apparatus drain valve and an isolation valve; a pressure indicator transmitter connected to the fluid inlet line, the pressure indicator transmitter in electronic communication with the apparatus electronic control system; a temperature indicator transmitter connected to the fluid inlet line, the temperature indicator transmitter in electronic communication with the apparatus electronic control system; and a flow elements manifold receiving fluid from the fluid inlet line, the flow elements manifold including a plurality of flow runs, each flow run operable to measure a different range of flow rates, each flow run including an orifice and a differential pressure transmitter in electronic communication with the apparatus electronic control system.

Embodiments of the seat leak measurement system for a ball valve include one or more of the following features.

In some embodiments, the plurality of flow runs includes a low flow-rate run, a medium flow-rate run, and a high flow-rate run. In some cases, the apparatus electronic control system operates valves of the valve seat leak measurement apparatus to switch between flow run based as leakage flows exceed measurement capacities of specific flow runs.

In some embodiments, each flow run includes two valves isolating the differential pressure transmitter from a main flow path of the flow run.

In some embodiments, the seat leak measurement system also includes a bypass line providing a fluid path between the fluid inlet line and an outlet header that does not pass through the flow elements manifold.

In some embodiments, the apparatus electronic control system provides a flushing. The seat leak measurement system of claim by-pass mode, a measurement mode and an idle mode. In some cases, the apparatus electronic control system determines that ball valve is damaged if pressure measured by the cavity pressure sensor of the ball valve remains above atmospheric after the drain valve is opened and measurement mode is initiated.

In some embodiments, the upstream valve and a downstream valve hydraulically isolate the flow elements manifold from other portions of the valve seat leak measurement apparatus and the flow elements manifold is removable from other portions of the valve seat leak measurement apparatus.

In some embodiments, the seat leak measurement system also includes a pressure indicator transmitter isolation valve disposed between the pressure indicator transmitter and the fluid inlet line and a purge valve disposed between the pressure indicator transmitter isolation valve and the pressure indicator transmitter.

In some embodiments, a pressure gauge connected to the fluid inlet line. In some cases, a pressure gauge isolation valve disposed between the pressure gauge and the fluid inlet line and a purge valve disposed between the pressure gauge isolation valve and the pressure gauge.

In some embodiments, the connector of the cable is directly connectable to the valve sensor retrieval fitting.

In some embodiments, the valve sensor retrieval fitting comprises a cable male connector plug which isolates valve sensor cables, a back seal of the female connector which provides sealing in a fully retrieved position, and a pipe-tee packing neck which provides fluid sealing in case of damage of the cable male connector plug during operations.

In some aspects, a multi-piece ball valve includes: a body; a first closure piece attached to the body, the first closure piece and the body together defining an interior cavity; a ball disposed in the interior cavity, the ball defining a bore extending through the ball; a load sensor ring disposed in an annular cavity defined in an outer surface of the body between the body and the at least one closure piece; a pressure sensor operable to sense fluid pressure between the body and the first closure piece; an electronic control system in communication with the load sensor ring and the pressure sensor.

Embodiments of the multi-piece ball valve include one or more of the following features.

In some embodiments, a first conduit machined in the body extends between the cavity defined in an outer surface of the body and a cable sealing plug. In some cases, the pressure sensor is a capillary pressure sensor extending through a second conduit machined in the body between the cable sealing plug and a gap between the body and the first closure piece.

In some embodiments, the pressure sensor includes a fluid-sensitive cable placed on a ring cavity machined on the body and end segments of the fluid sensitive sensor cable extend through the second conduit to the cable sealing plug. In some cases, the fluid sensitive cable comprises a fiber optic cable capable of detecting the passage of the leaked fluid. In some cases, the electronic control system is operable to determine the location of the leak across any point around the valve body-closure piece joint circumference by having the logic solver to execute a leak location routine based on light pulse bandwidth scattering reflectometry methods. In some cases, the gap between the body and the first closure piece adjacent the diaphragm is between a body-joint O-ring and a fire-safe gasket ring.

In some embodiments, the multi-piece ball valve is a 3-piece ball valve also includes a second closure piece.

In some embodiments, the load sensor radially measures a mechanical load between the body and the closure piece.

In summary, the disclosed technology is a comprehensive valve diagnostic system that provides unique and specific apparatuses and instrumentation to address the various valve problems that can be found in industrial valves in plants worldwide. The apparatuses of this invention can be built inside an existing valve parts. Any existing valve can be adopted to perform a self-diagnostic of its current condition without the need for additional instrumentation. This technology include an embedded diagnostic system for valves that find applications in many industries such as oil and gas, petrochemical, chemical, pharmaceutical, food processing and water transportation.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This specification describes valves that include diagnostic and performance monitoring system that can be used, for example, for industrial plant isolation valves. The configuration of these diagnostic and performance monitoring system generally increase ease of maintenance and access for split-body valves. These systems quantitatively detect and measure on-stem valve torque and position, the flowrate of the valve seat, valve stem packing leaks, valve body-closure joint leaks, pipeline pig (scraper) position inside the valve, and valve performance deviations against original specified conditions. The system also monitors performance of preventive maintenance procedures and locates the damaged and misaligned seats of the valve. The system is equipped with a local data-logging device, a logic solver, and remotely readable tags for recording valve design and evaluating performance data and performance deviation. The term "logic solver" is used conventionally to indicate a hardware device or a software system whose inputs and outputs are connected to safety critical devices.

The system includes sensors connected and inserted into the valve body, a controller for valve seat leak measurement, a communication device, and an interface electrical housing. The interface electrical housing hosts a diagnostic logic solver. The logic solver features a non-volatile memory, an internal power pack connection for external power sources, and communication ports. The system of the present disclosure includes a seat leak flow apparatus which determines the leaking valve seat and computes the leak flow-rate compensated for temperature and pressure The flow measurement is performed at actual flowing conditions, and the flow rates are expressed at standard conditions of pressure and temperature. The actual flow measurement is recalculated (i.e., compensated) for the specific flowing conditions of pressure and temperature including change in fluid density.

Valve Configuration

Figure 1A:
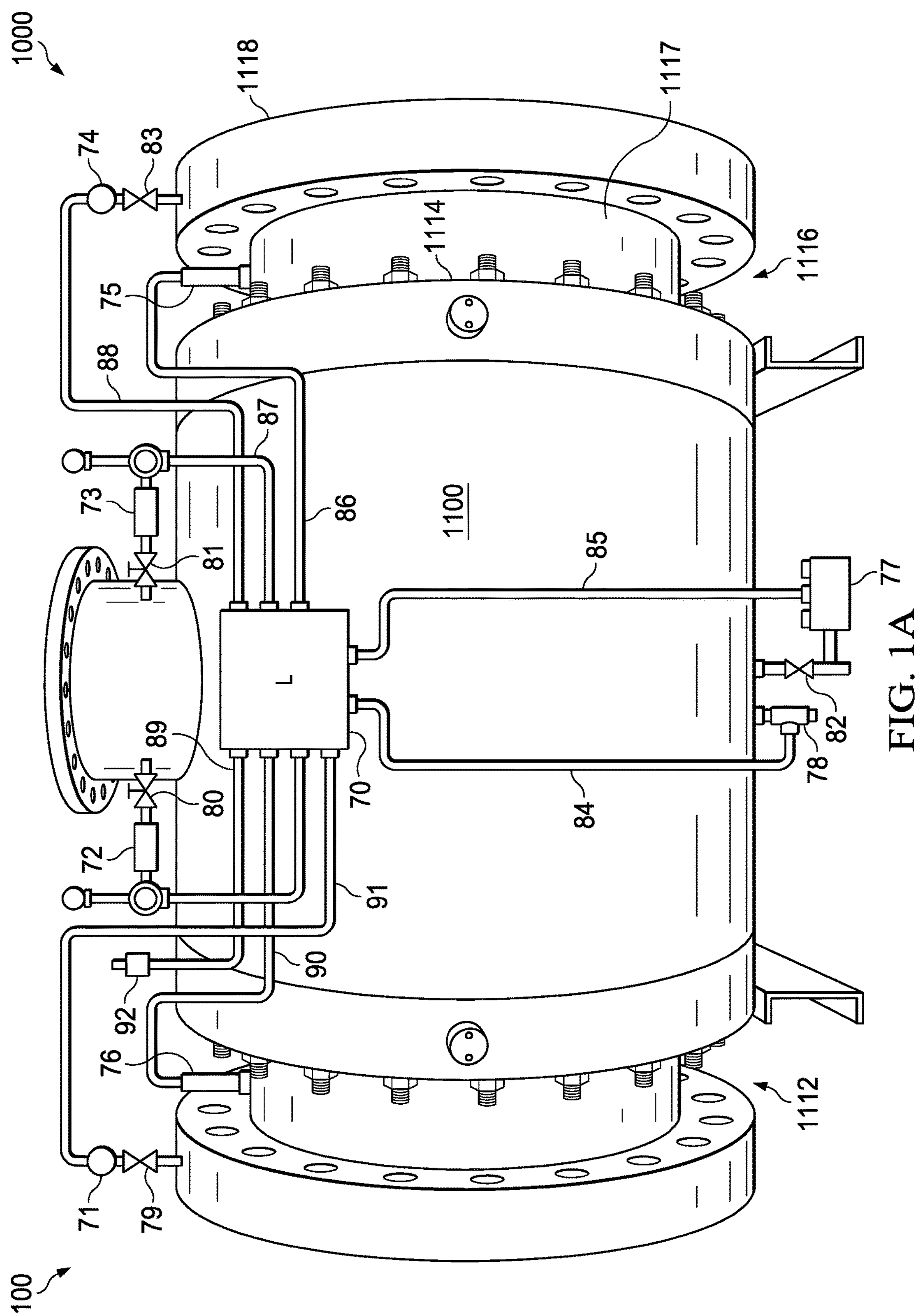
FIG. 1A is a side view of a ball valve of a Class 1 Div 2 installation incorporating a diagnostic and performance monitoring system.
Figure 1B:
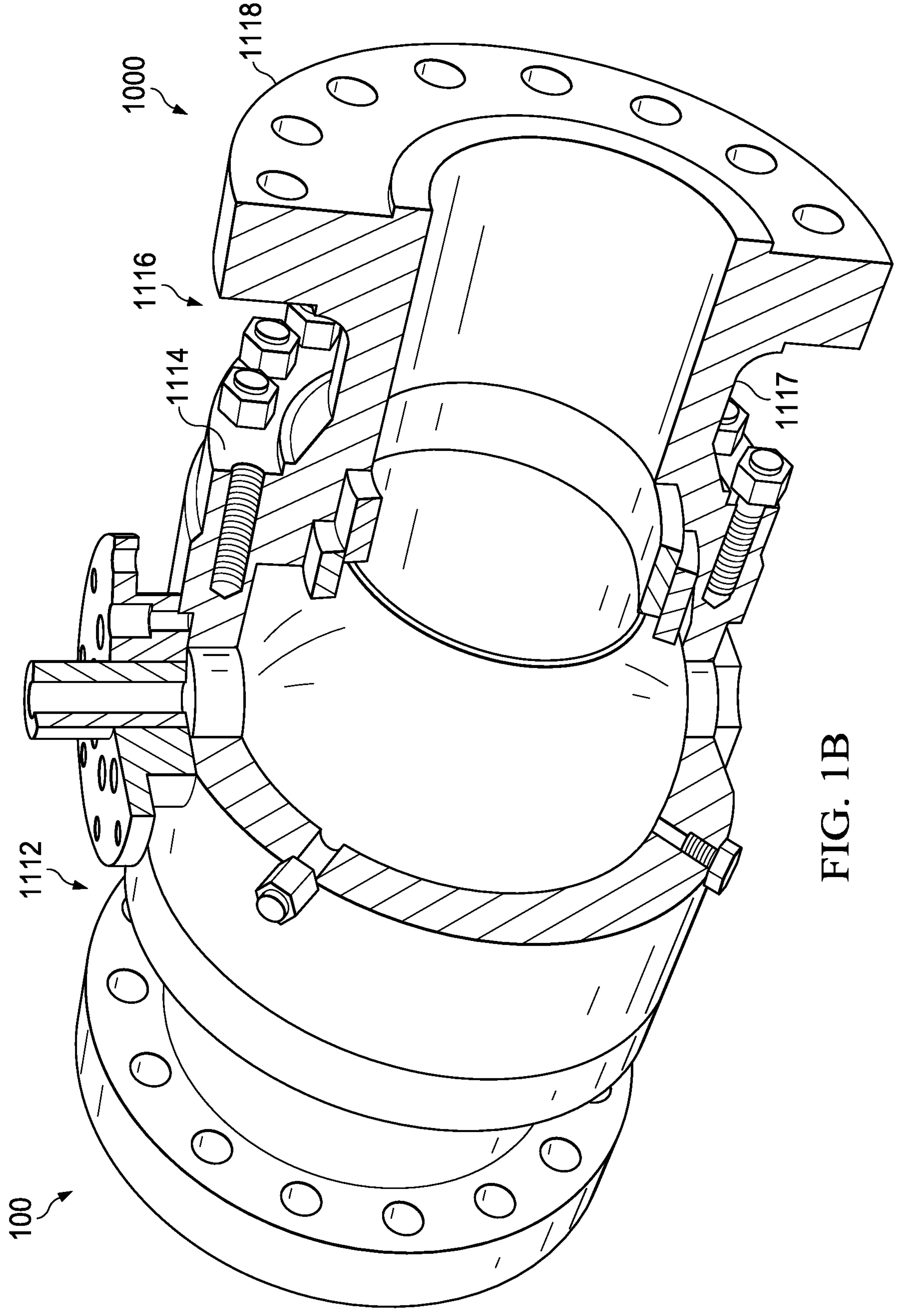
FIG. 1B is a schematic cross-sectional view of the ball valve.

FIGS. 1A and 1B are, respectively, a perspective view and a cross-sectional view of an isolation valve 1000 of a Class 1 Div 2 installation. The isolation valve 1000 is a three-piece ball valve with a valve body 1100 holding a ball 1104 that defines a central bore 1108. The central bore 1108 through in the ball 1104 is the same size as a pipeline to which the isolation valve 1000 is attached. This sizing results in lower friction losses as flow through the valve 1000 is unrestricted and permits pigging of the pipeline but the valve 1000 is larger and more expensive than valves with smaller balls.

A valve stem 1110 extends upwards from the ball 1104. A valve actuator 332 as attached to the valve stem 1110 and is operable to rotate the ball 1104 between its open position and its closed position. The body 1100 is attached to an upstream closure piece 1112 and a downstream closure piece 1116. The closure pieces include a body 1117, an outer flange 1118, and an inner flange 1119. The closure pieces are sometimes referred to as body flanges. Floating valve seats 1120 within the valve body 1100 hold the ball 1104 in position within the valve body The three-piece design allows for the valve body 1100 containing the ball 1104, the valve stem 1110, and the valve seats 1120 to be easily removed from a pipeline. This facilitates efficient maintenance and repair of the valve 1000.

The valve 1000 includes a logic solver 1124, which monitors and controls the sensors described in detail with respect to FIGS. 8-24. A logic solver enclosure 70 is mounted on the valve body 1100 receives sensor input electrical conduits 84, 85, 86, 87, 88, 89, 90 and 91 from the sensor system. In some embodiments, the cables of the seat misalignment sensor, the pig passage sensor, the body flange load and the fluid fireproof body joint sensors travel into the conduit 84 to the logic solver enclosure 70. In some embodiments, the pig sensors 75 and 76 connect to the logic solver enclosure 70 by conduits 86 and 90, respectively.

The upstream pressure sensor 71, isolated by the root valve 79, and the downstream pressure sensor 74, isolated by the root valve 83, connect to the logic solver enclosure through conduits 91 and 88, respectively. The root valves are valves that isolates the instrument from the process and are generally close to the process line. The pressure sensors can be explosion-proof pressure transmitters that are ATEX or IECEx approved for Class I, Div. 1 hazardous areas. These transmitters can provide current or voltage output and are designed for harsh ambient conditions. The conduit 89 provides a pathway to connect the logic solver enclosure 70 with the valve actuator through the connection coupler 92.

Logic Solver Connectivity and Enclosure

Figure 2:
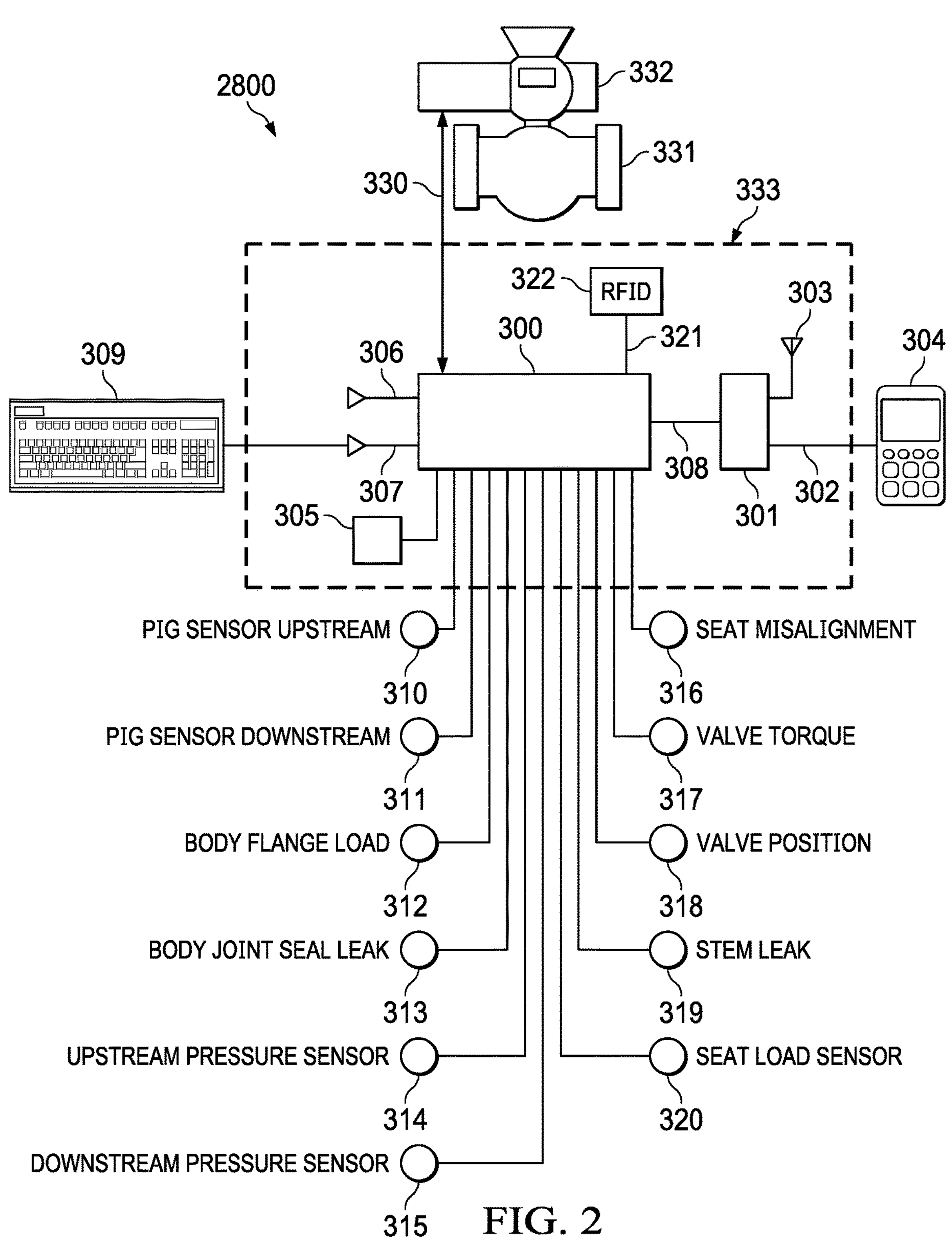
FIG. 2 is a schematic of the logic solver connections.

FIG. 2 is a schematic illustrating the logic solver 300 and its connectivity. The logic solver 300 connects via a data link 308 to a communication module 301. The communication module 301 is contained in the logic solver enclosure 70 shown in FIG. 1A. The communication module 301 provides hardwired communication through a hardwired link 302 or wireless communication by an antenna 303 to a handheld device 304. The device 304 reads and writes data from and to the logic solver 300. The logic solver 300 is externally powered by a power pack 305 installed inside the logic solver enclosure 70 in order to allow power supply autonomy. In some embodiments, the logic solver is alternatively or additionally provided with other power sources (e.g., hardwired into a plant electrical system).

Figure 15:
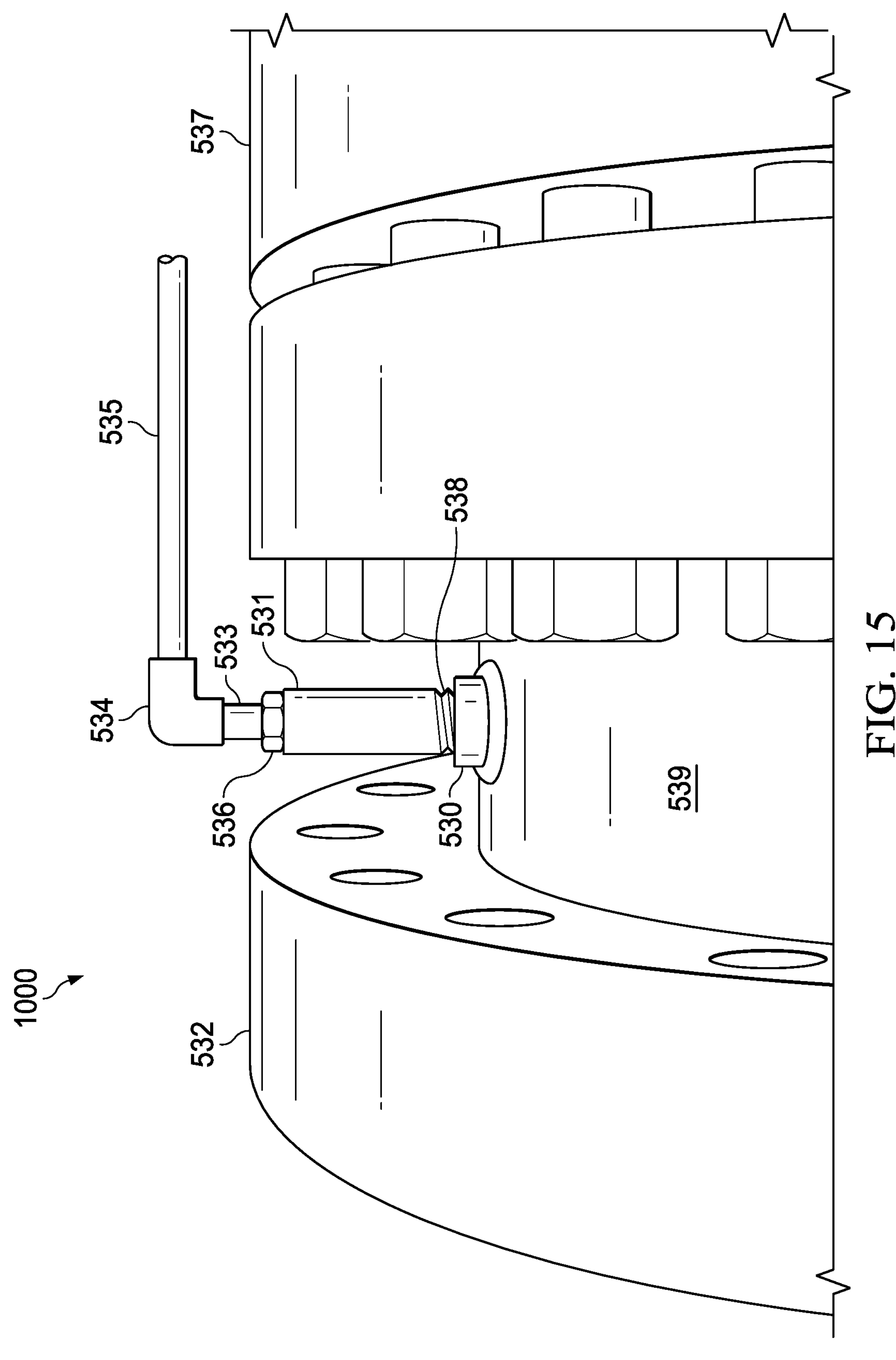
FIG. 15 is an isometric view of a mechanical coupling of a pig detection sensor, an electrical conduit, and conduit fittings that connect to the logic solver enclosure.
Figure 16:
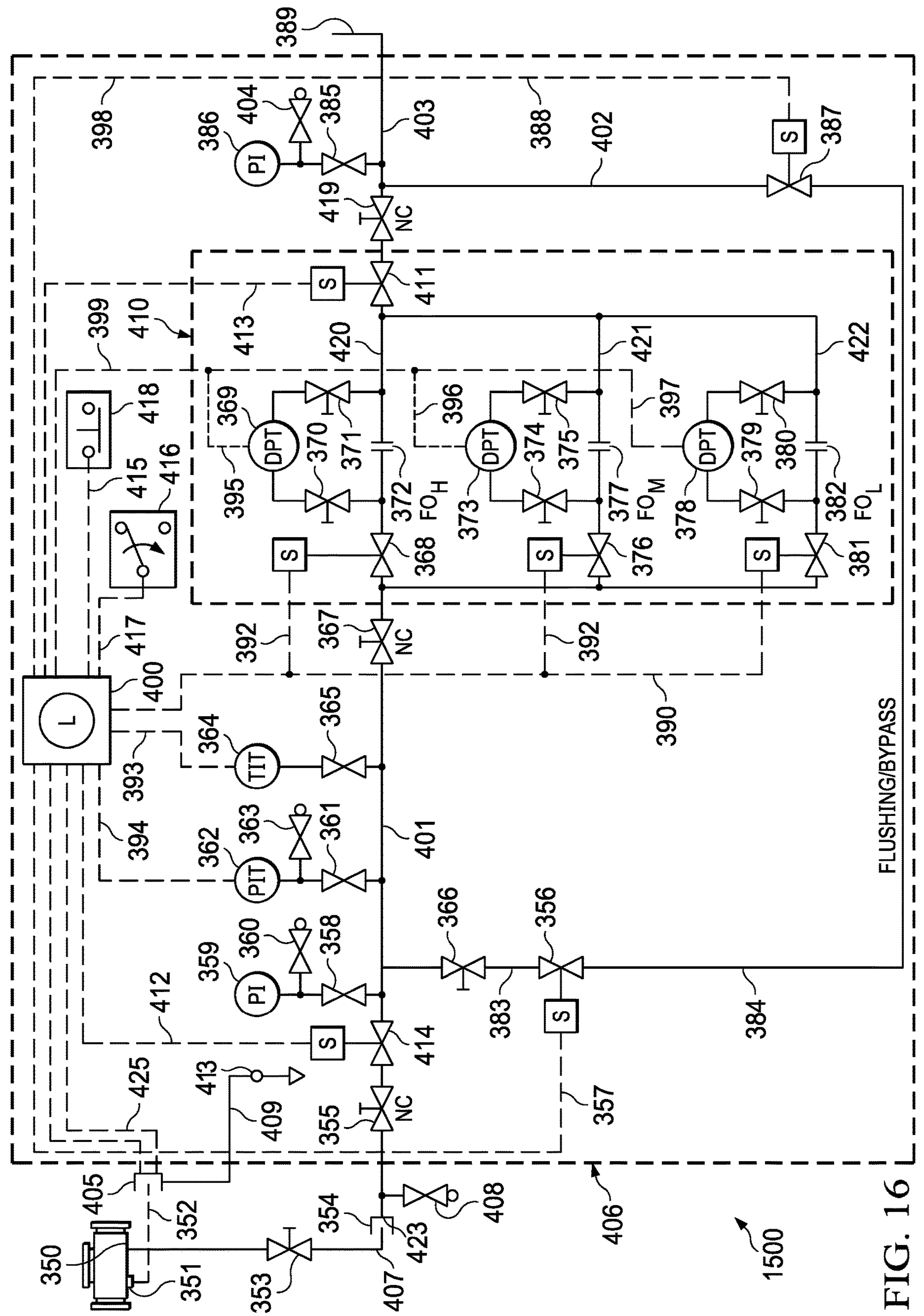
FIG. 16 is a piping and instrument diagram of the seat leak flow rate measurement apparatus showing instruments, valves, logic solver, electrical signals of instruments, solenoid valves and logic solver, and mechanical and electrical connections.

The logic solver 300 provides communication ports 306, 307 for programming, for communication with a seat leak flow rate measurement apparatus (e.g., the seat leak flow rate measurement apparatus described with respect to in FIG. 16), and for connection with an external display and keyboard module 309, respectively. The logic solver 300 also provides a communication port 340 for communicating with the valve actuator 332. The logic solver receives a data link 321 from a RFID tag 322 which stores data of the entire system 333, sensors 310, 311, 312, 313, 314, 315, 316, 317, 318, 319, and 320, as well as valve 331 and actuator 332 data. Regularly at a time frame specified by the user in the logic solver 300, the RFID tag 322 is programed to include performance deviations of the valve and the actuator parameters, as well as system 333 parameters which all are simultaneously stored in the non-volatile memory block 305. The logic solver 300 receives inputs from the pig passage strain sensors 310, 311, the body flange load sensor 312, the fluid fireproof body joint sensor 313, the piezoelectric seat load sensor 320, the stem leak sensor 319, the upstream pressure sensor 314 and the downstream pressure sensor 315, seat misalignment sensor 316, the valve torque 317 and the valve position 318. These sensors are described in more detail with respect to FIGS. 8-24.

Figure 3:
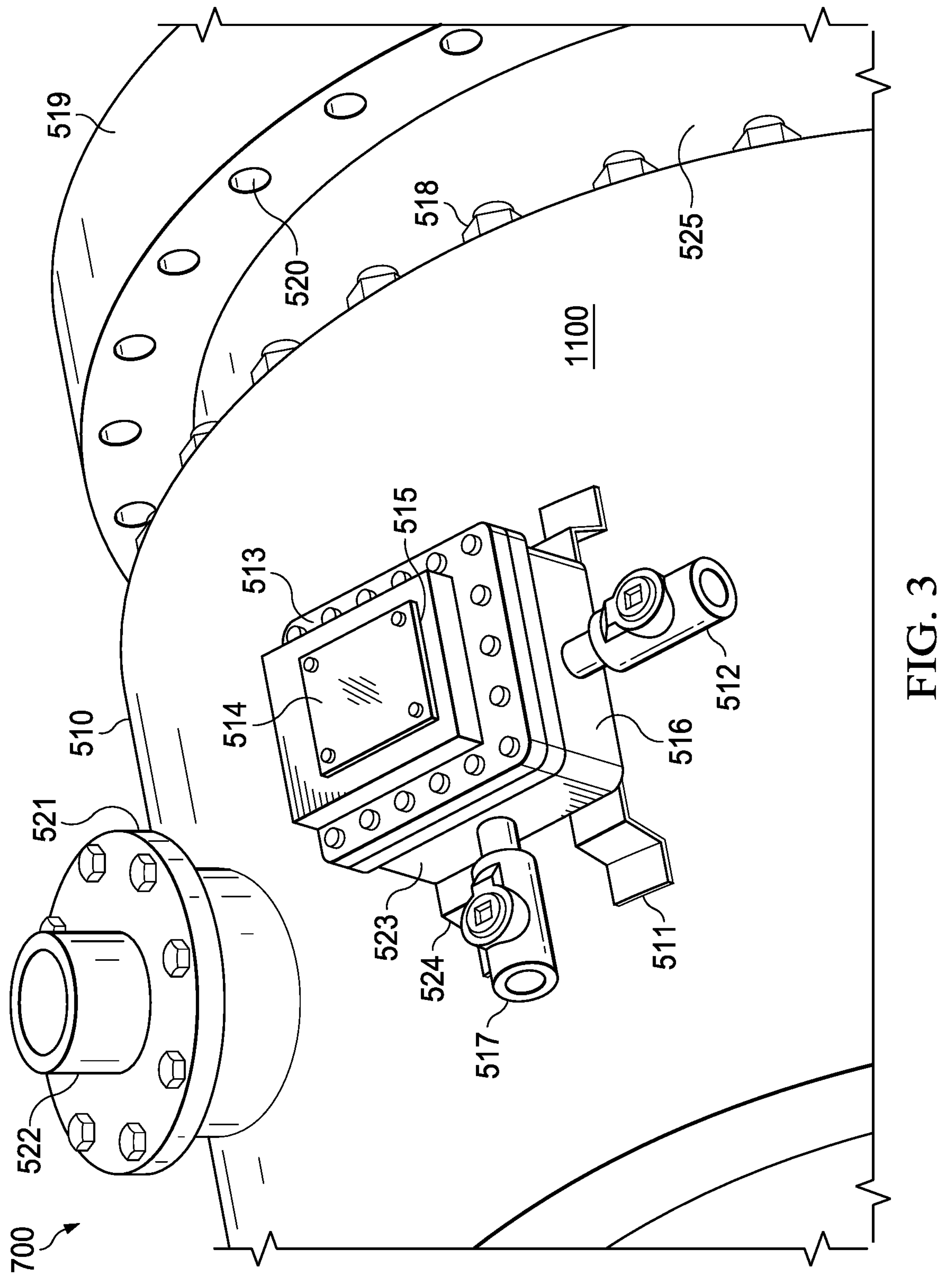
FIG. 3 is a perspective view showing the enclosure of the logic solver of a valve of a Class 1 Div 1 explosion proof installation.

FIG. 3 illustrates the enclosure 523 of a logic solver 300 of a valve of a Class 1 Div 1 explosion proof installation in position relative to the valve stem 522 and top flange 521 of the isolation valve 1000. Bolts 518 attach the closure piece 525 to the body 1100 of the valve 1000. Similar bolts are installed through bores 520 defined in the outer flange 519 of the closure piece 525. The RFID 515 is inserted under the plate 514, mounted on the enclosure cover 513. The plate 514 is used to provide written design and installation details of the system for the user to visualize onsite. The enclosure 523 is mounted on the valve body 510 by support plates 511, 524 welded on the main valve body 510. The sealing conduit fittings 512, 517 provide protection to the incoming and outgoing cables of the logic solver 300.

Figure 4:
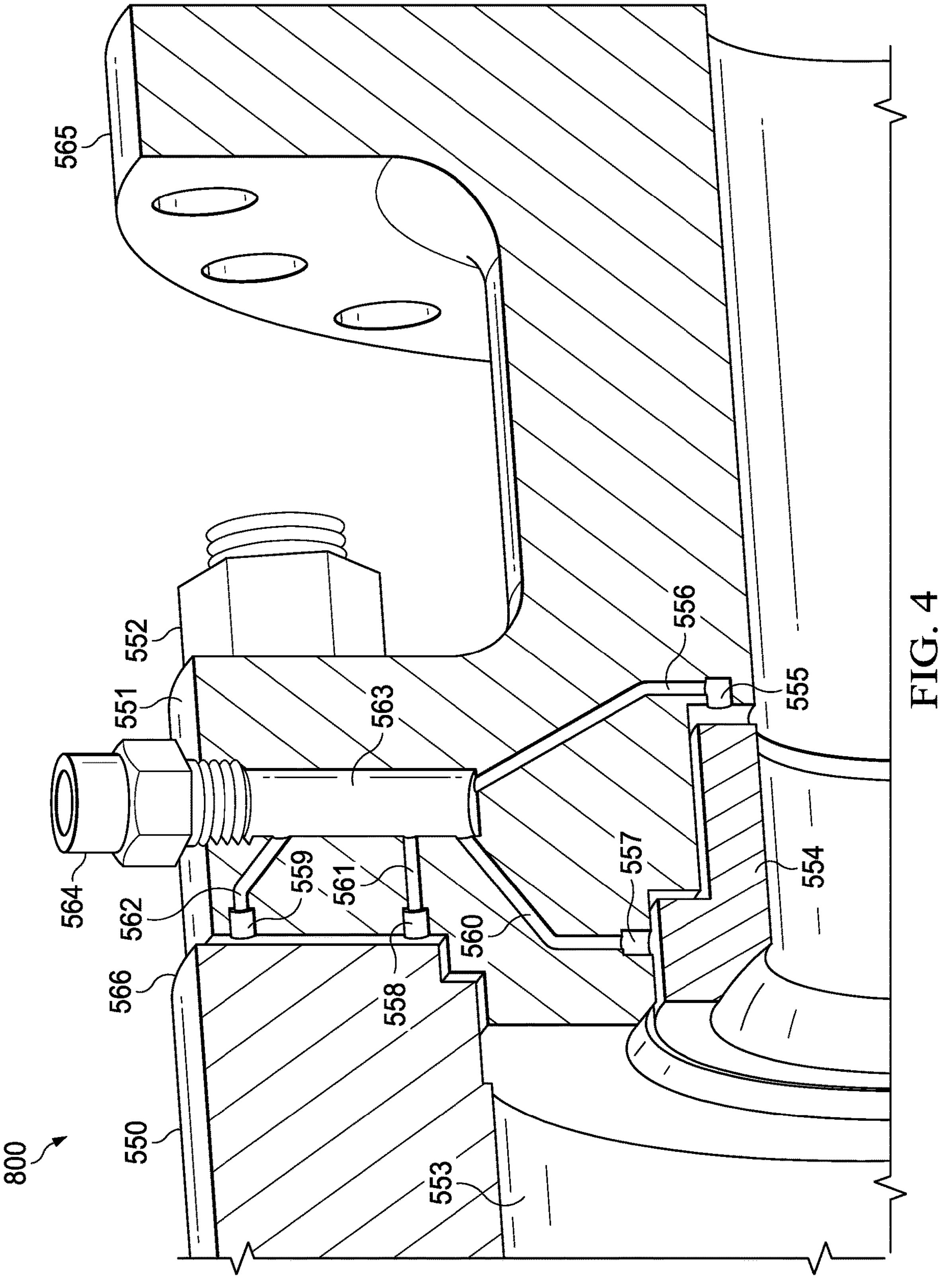
FIG. 4 is a schematic of a section of the top valve body and a valve body closure section with internal conduits of the body leak sensor.

FIG. 4 shows a sectional view of the top of the valve body 550, a joint 566 of the body closure piece 551, and an upper portion of the valve flange 565. A main internal conduit channel 563 is machined into the body 551 of the in order to provide a pathway for the cables of the body flange load, body joint leak and misalignment sensors, which connect to the main channel 553 by the machined internal conduits 562, 561, 556, respectively. The body flange load sensor cavity 559, body joint leak cavity 558, and misalignment sensors cavities 555, 557 provide bonding to the main closure piece body 551 for the sensors. Sensors in the misalignment sensors cavities 555, 557 measure forces on the seat.

Internal and External Conduits

Figure 5:
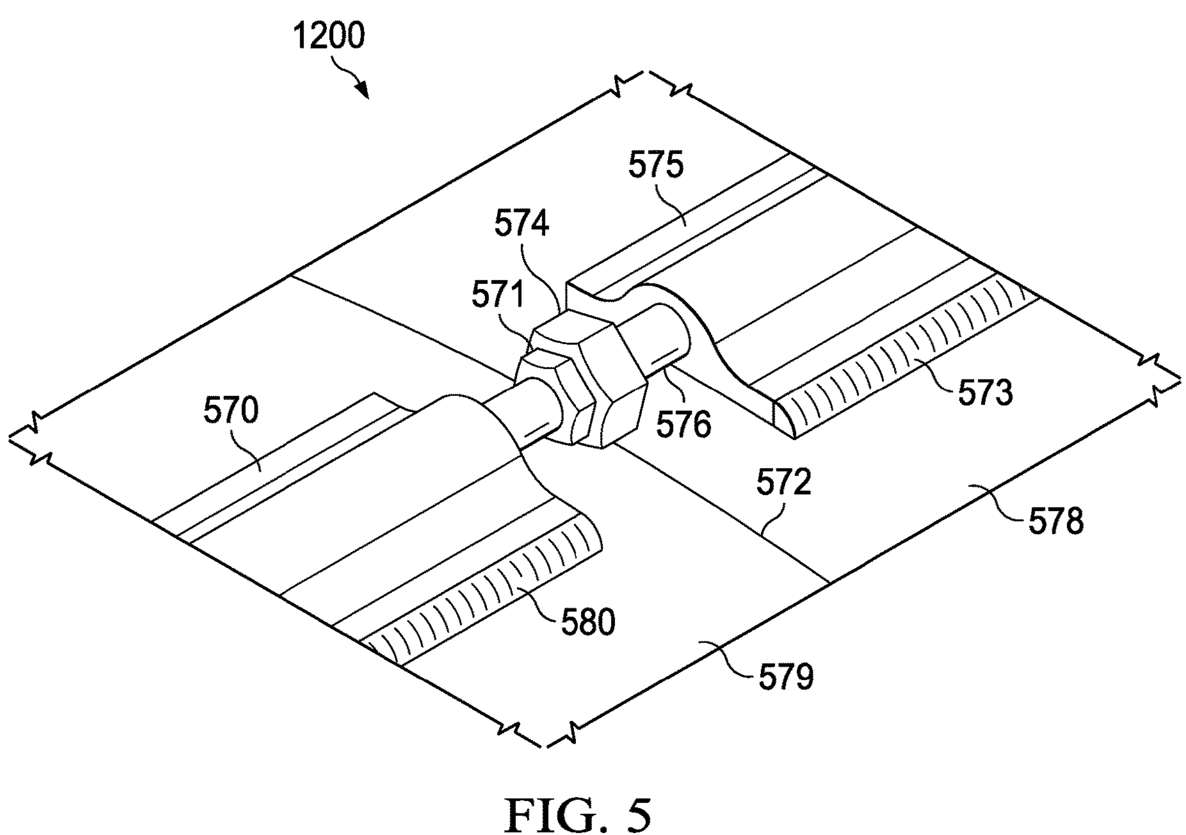
FIG. 5 is a perspective view of a joint of outer valve body conduit between a valve body and an end-closure piece.

FIG. 5 shows a perspective view of split electrical conduits 575, 570 welded as shown on sections 573 and 580 of the valve body and the double union assembly, 574, 571, nipple 576 at the joint 572 between the main valve body 578, and the closure piece body 579. The double union assembly, 571, 574 and 576 facilitates decoupling the electrical conduit pieces 570 from 575 at the joint 572 for maintenance or disassembly purposes. In particular, this specific construction o allows disassembling the main valve body from the flanged pieces and can be used in any other split body design valve. The illustrated joint can be used to disassemble the valve pieces for maintenance purposes and can also host an electrical connector inside the electrical conduit which can be disconnected in order to also spilt the electrical connections at the double-union piece 574.

Figure 6:
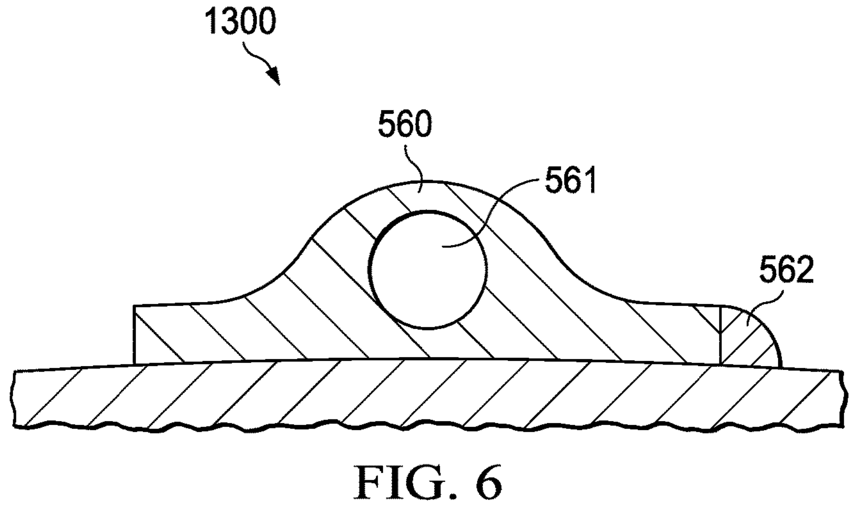
FIG. 6 is a sectional view of the outer valve body conduit that carries power and sensor signals on the outside of the valve body.

FIG. 6 shows a cross-sectional view of a section of the welded conduits bodies attached to the valve body and body closure body. This view shows the conduit body 560, the welding thread 562, and the inner conduit 561.

Figure 7:
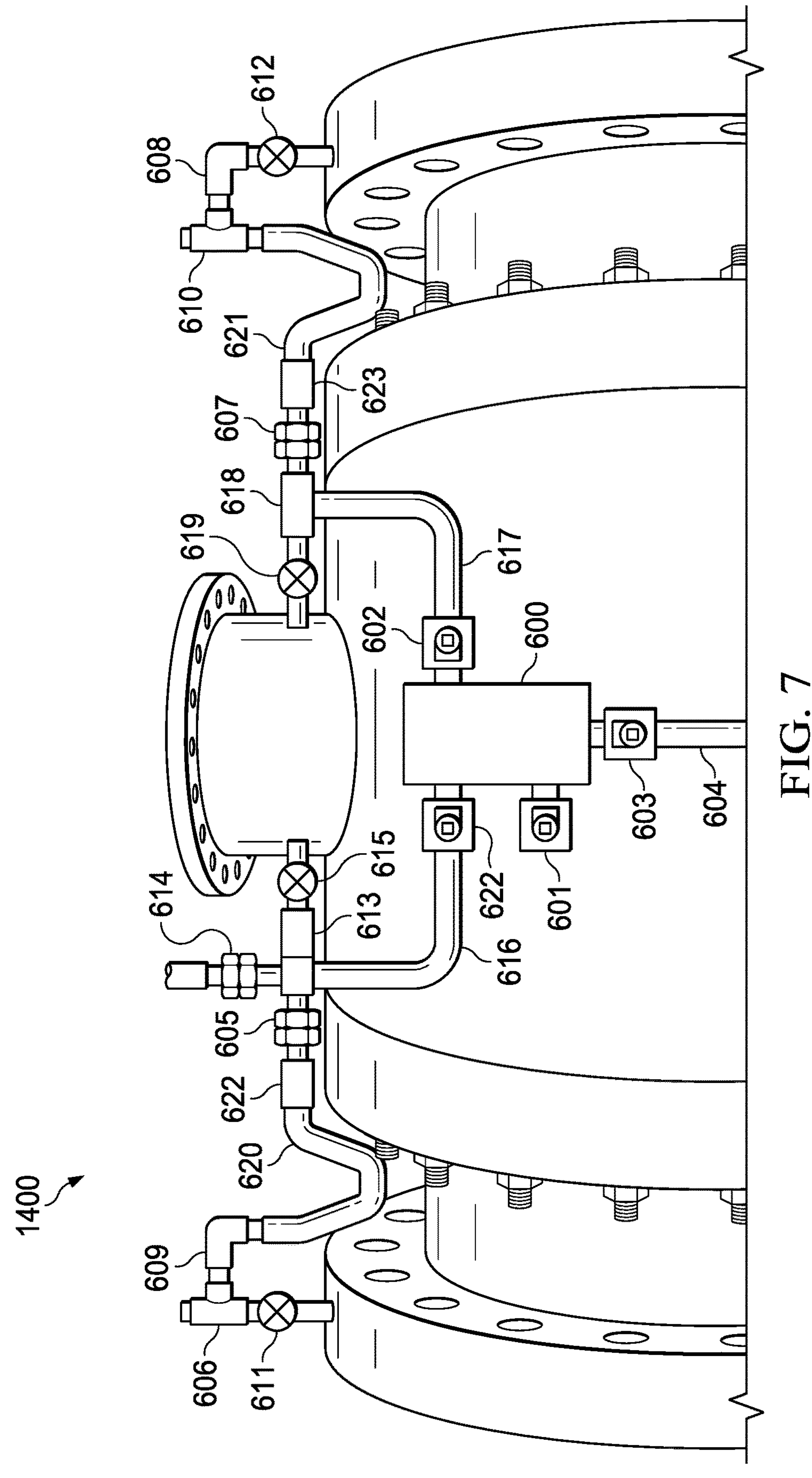
FIG. 7 is a schematic of a valve of a Class 1 Div 1 explosion proof installation utilizing the outer valve body conduits to connect upstream and downstream pressure sensors to the logic solver enclosure and stem packing leak apparatus along with the integrated position and torque assembly.

FIG. 7 shows a representation of the outer valve body welded conduits 604, 617, 616 attached on the main valve body, the conduits 620, 621 attached on the valve closure piece bodies of upstream and downstream valve ports. The conduits 620, 621 connect to interface pieces 622, 623, which are machined (pass thru holes) to provide the double unions 605, 607 with the necessary clearance (gap) from the closure body for rotating the double union nuts by a suitable tool for maintenance. Another union 614 allows the conduit system to connect to the valve actuator. The conduits 620, 621 connect to the upstream and downstream pressure transmitters 609, 608 electrical outputs, respectively. The isolation valves 611, 612 isolate the fluid connection of the transmitters. The pipe tees 606, 610 allow the connection of pressure gauges for operators to visually monitor upstream and downstream pressure. The conduits 616, 617 connects to the man logic solver 600 through conduit sealing bodies 602, 622 and 603. Additionally the logic solver enclosure allows connecting the logic solver to other devices through a sealing body 601, which is seen in this figure with its plug on. The pressure transmitters 609 and 608 are used by detecting the direction of the seat leak flow whenever leaks in a sustained manner, which normally takes place after permanent damage of the valve seat. It also shows a representation of the stem packing leak flow-rate apparatus 613 and its isolation valve 615, which are described more in details in FIG. 14.

Sensing Seat Misalignment

FIGS. 8-12 illustrate several approaches to sensing misalignment of the floating valve seats 1120 within the valve body 1100.

Both the upstream closure piece body 1112 and the downstream closure piece body 1116 include a seat misalignment sensor.

Figure 8:
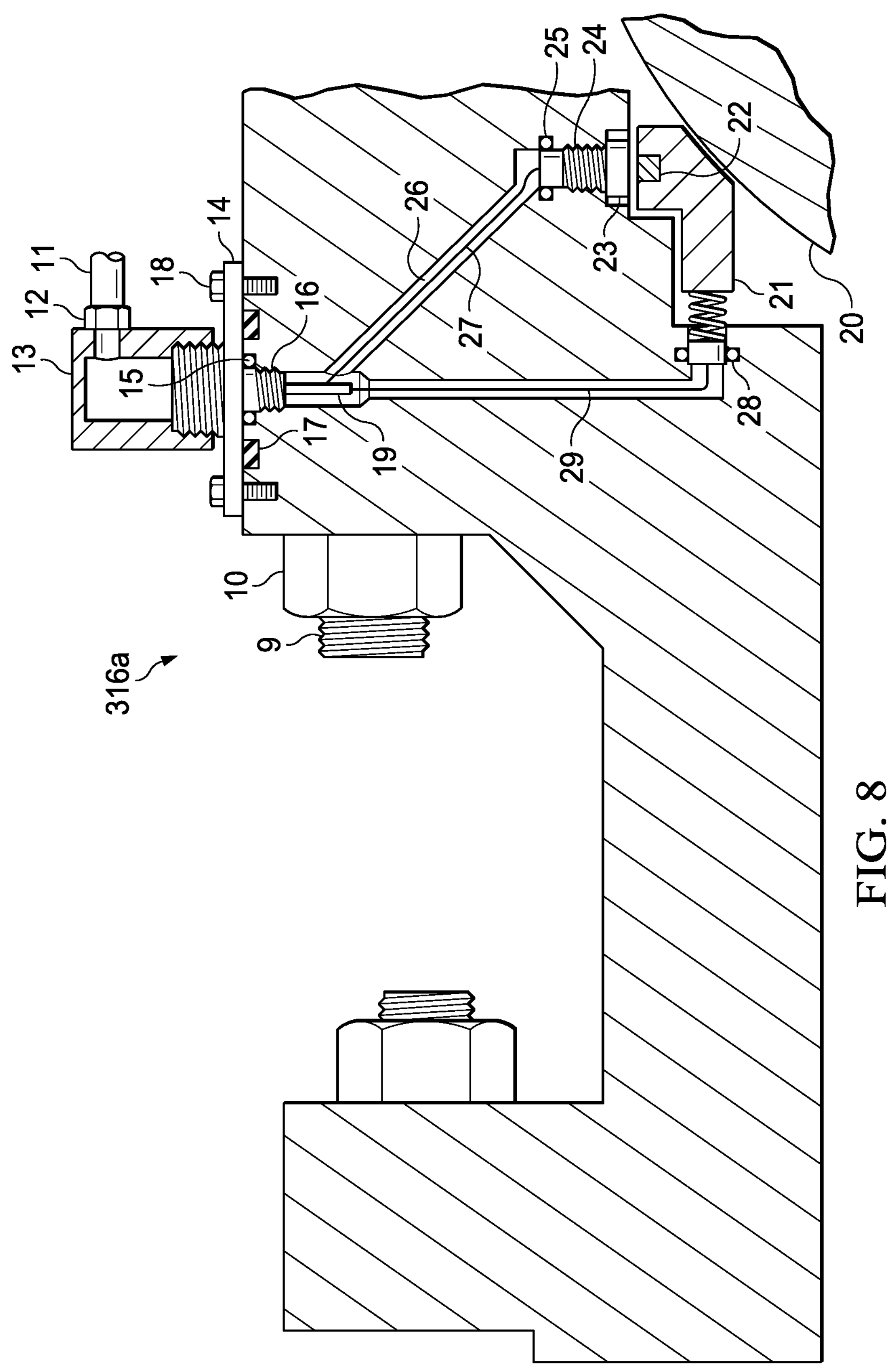
FIG. 8 is an isometric view of the machined conduits of the floating seat misalignment sensor for channeling sensor fibers.
Figure 9:
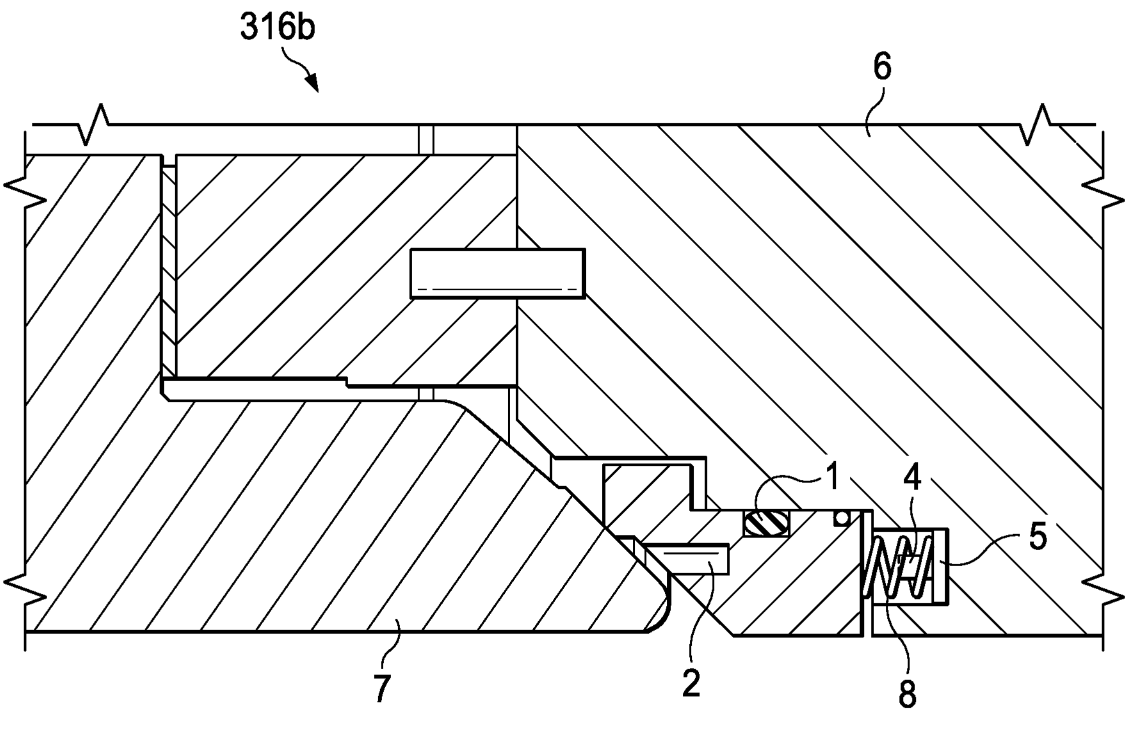
FIG. 9 is a sectional view of the floating seat tilt caused by misalignment of the seat with respect to the ball.

FIG. 8 shows a seat misalignment sensor system 316*a* that measures the misalignment of the floating seat 21 using an assembly of a ring sensor 23 incorporated in the closure piece body and a magnetized insert ring 22 which is inserted in the floating seat 21. The seat misalignment sensor 316*a* of the upstream closure piece body 1112 is illustrated in FIG. 9. The floating seat 21 is shown between the ball 20 and the upstream closure piece body 1112.

Output cables 27 for the ring sensor 23 pass through a threaded sealed plug 24, which ends in a flat finishing surface. This configuration provides further isolation against the O-ring 25 seated into a groove machined into the closure piece body. An internal conduit 26 is drilled at an angle to allow the sensor output cables 27 to reach a sensor conditioning electronic board 19. Output terminals of the sensor conditioning electronic board 19 terminate directly in a pressure isolation threaded plug 16. Sensor cables 29 for a piezoelectric sensor 1128 reach thru an internal conduit to the sensor conditioning electronic board 19. Both sensor output cables 27 and 29 reach the sensor conditioning electronic board 19, which provides power to the sensors and receives readings from the sensors. The sensor conditioning electronic board relays the readings to an external receiving electronic board. One approach to connecting the sensor conditioning electronic board to the external receiving electronic board is described in detail with respect to FIG. 27. The sensor output cables 27 of the pressure isolation threaded plug 16 are further protected by the interface isolation flange 14, which is bolted by bolts 18 into the body 1117 of closure piece and is provided ingress protection by the O-Ring 15 and the fire-safe gasket 17.

FIG. 9 shows a seat misalignment sensor system 316*b* that uses another approach to sensing misalignment of the floating valve seats 1120 within the valve body 1100. The seat misalignment sensor system 316*b* gives multiple readings for stem leakage. In the seat misalignment sensor 316*b*, a seat insert 2 is floating between the ball 7 and the inner body. The seat insert 2 extends into a cavity defined in the floating seat 3. A seat O-ring 1 provides a seal between the floating seat 3 and the closure piece 6. A fiber optic insert 5 with an embedded fiber 4 is seated in a groove machined on a seat pocket area of the end closure 6. A spring 8 is attached to the floating seat 3 and extends between the floating seat 3 and the fiber optic insert 5. The floating seat 5 pushes the spring 8 which seats on the fiber optic insert 5. The mechanical pressure of the floating seat translates into a mechanical load on the fiber optic insert 5 received by the fiber optic 4 and connects to the logic solver 300 to measure the imbalance of loads along circumference of the floating seat 3. The imbalance in the loads is caused by misalignment of the seat against the closure piece. The misalignment is formed as a result of debris, dirt or contaminants that travel within the fluid.

Figure 10:
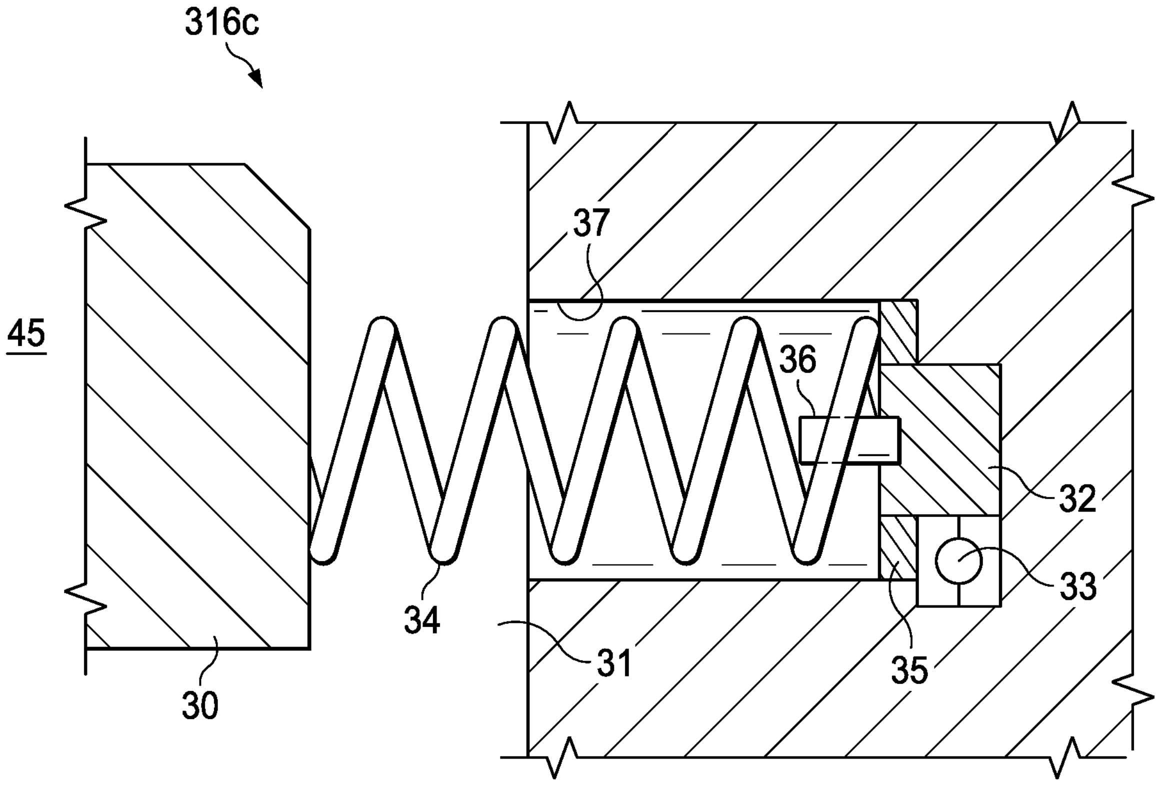
FIG. 10 is a sectional view of the spring assembly.

FIG. 10 shows a seat misalignment sensor system 316*c*. The seat misalignment sensor 316*c* is generally similar to the seat misalignment sensor 316*b* in including a spring 34 extending from a valve seat 30 into a bore 37 drilled into the seat pocket area. The spring 34 seats on a spring ring 35. The spring 34, which holds the valve seat 30 from its rear side facing the pocket area 31 of the closure piece, exerts a force on a piezoelectric sensor 32 by pushing a pin 36 attached to the piezoelectric sensor 32. A piezoelectric sensor output signal cable 33 extends through an annular conduit. In order to determine the orientation of the misalignment towards any of the 4 quarters of the ball valve, a minimum of 4 piezoelectric misalignment sensors are needed at the 12, 9, 6, 3 o'clock positions around the seat ring to detect vertical and horizontal displacements of the floating seat ring against the pocket area. The piezoelectric sensor output signal cable 33 collects the signal of the sensors located around the seat ring (e.g., at the 12, 9, 6, 3 o'clock positions).

Figure 11:
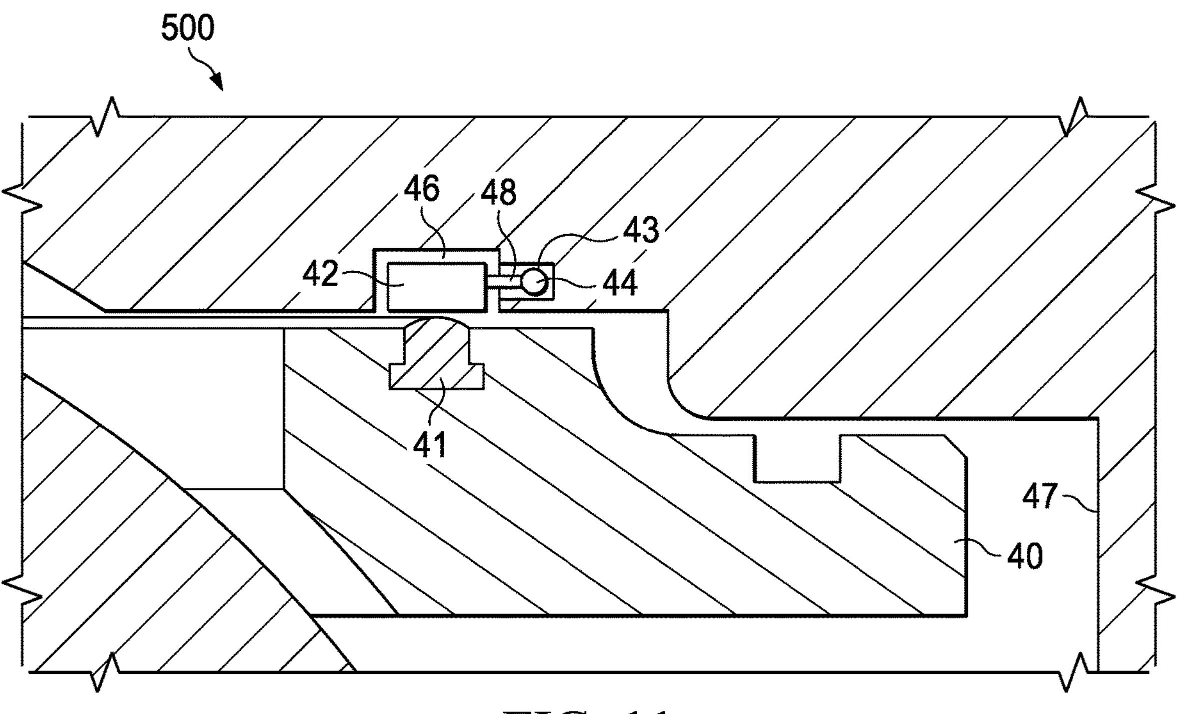
FIG. 11 is a sectional view of a misalignment sensing apparatus.

FIG. 11 shows a seat misalignment sensor system 316*d* in which a piezoelectric sensor 42 is approached by a pusher ring 41 inserted in the floating seat 40. In this embodiment, a plurality of piezoelectric sensors 42 distributed around a machined groove 46 detect the motion of the floating seat 40 towards the pocket seat area 47. The output cables 48 of the piezoelectric sensor 42 enter into the inner conduit ring 44 which carries the output cables from the plurality of piezoelectric sensors.

Figure 12:
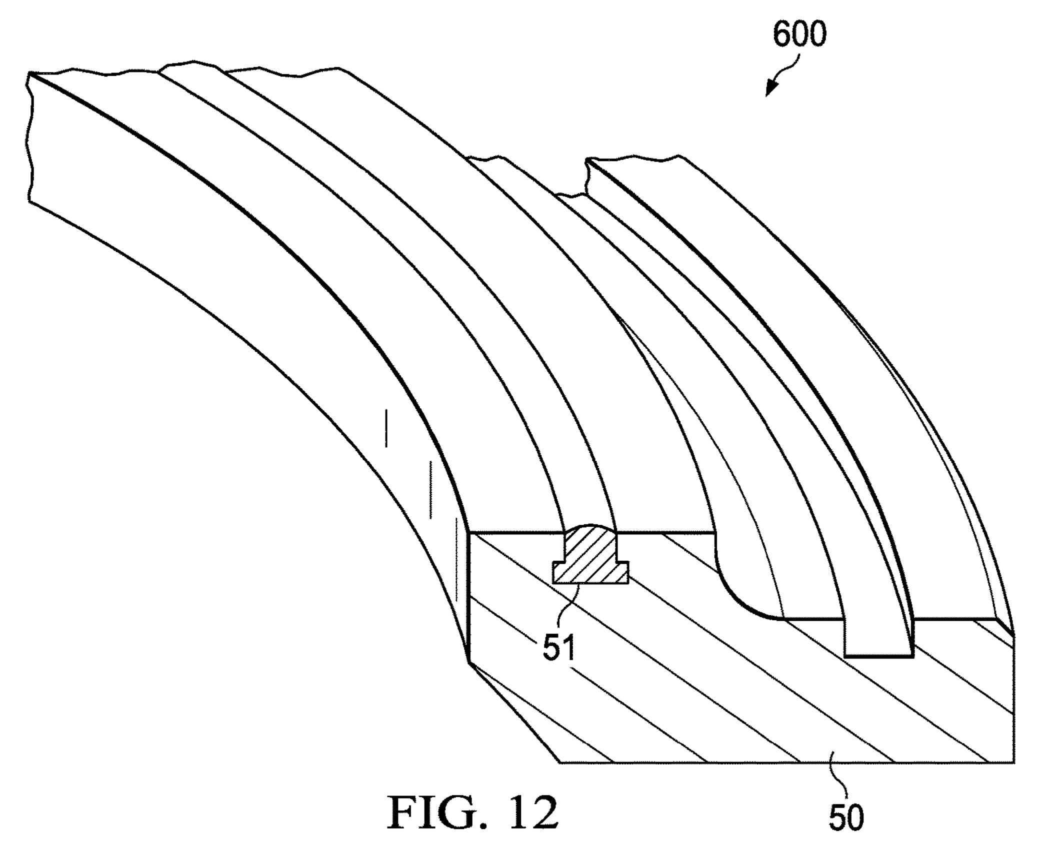
FIG. 12 is an isometric illustration of a floating seat and the non-metallic insert of the valve.

FIG. 12 shows an isometric representation of the pusher insert 51 on the floating seat 50.

Integrated Stem Leak Flow-Rate, Torque and Position Sensing Apparatus

Figures 13A, 13B:
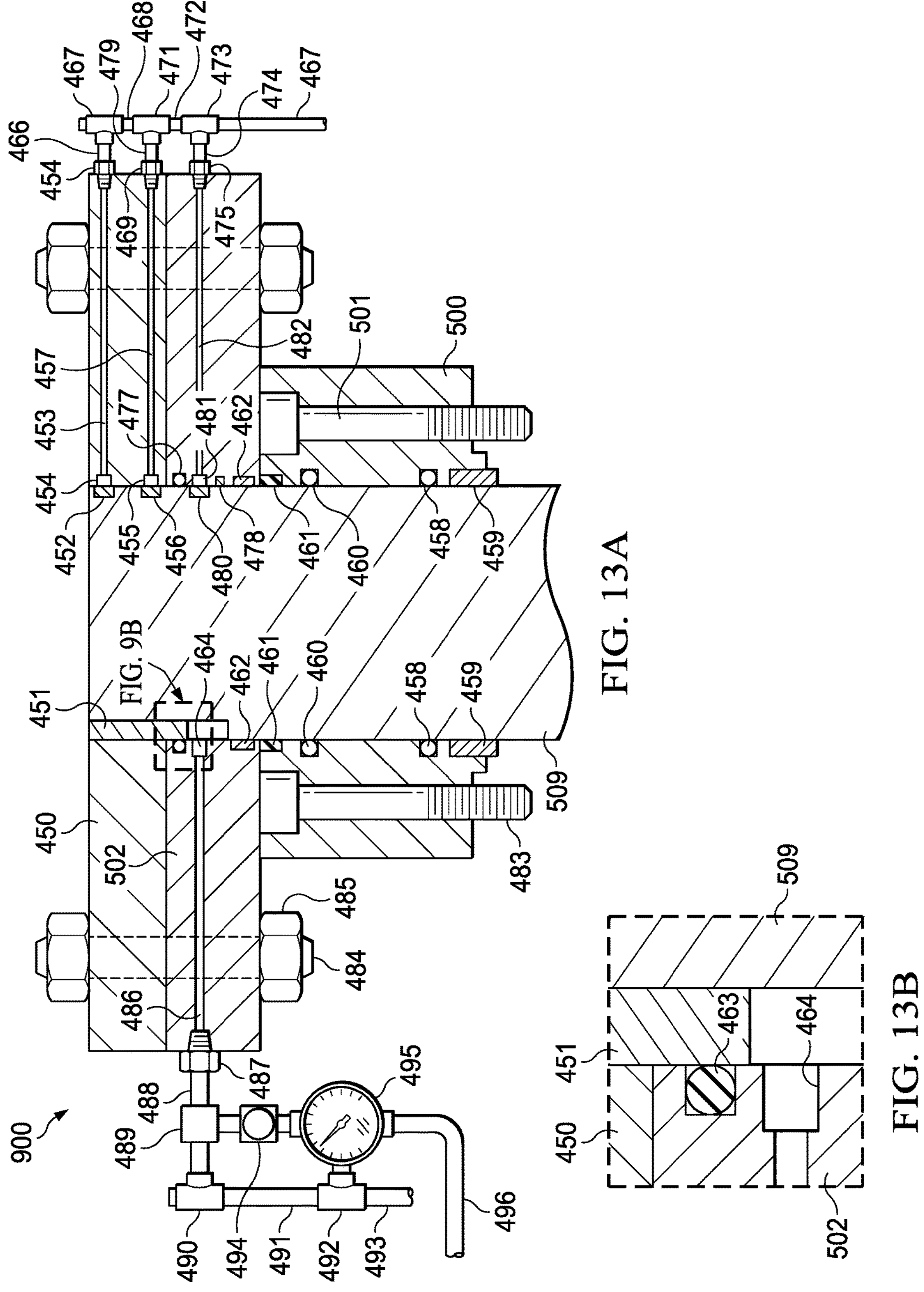
FIGS. 13A and 13B are schematic views showing details of the integrated stem leak flow-rate, torque and position sensing apparatus, and design features of the top valve-actuator interface flange.

FIGS. 13A and 13B are schematics showing details of an integrated stem leak flow-rate, torque and position sensing apparatus 900, and design features of an associated valve gland 500 and top valve-actuator interface flange 502. In the stem leak flow-rate, torque and position sensing apparatus 900, the torque is measured by the hall-effect sensors 481, 455, which are also used to measure position of the valve stem. The sensors 481, 455 are mounted inside drilled cavities machined on the top valve-actuator interface flange 502 and the actuator flange 450, respectively. The stem leak flow-rate, torque and position sensing apparatus 900 includes another hall-effect sensor 454 that, like hall-effect sensor 455, is installed in a drilled cavity on the actuator flange 450. This approach enables this system to be implemented on valves that are already in operation without machining the valve-actuator interface flange 502. Some actuator flanges only include a single hall-effect sensor as the second hall-effect sensor on the actuator flange is not necessary for valves with the hall-effect sensor 481 on the valve-actuator interface flange 502.

The torque hall-effect sensor 481 reads the magnetic induction vector angle generated by magnetic inserts 480 mounted on the stem 509. The output signal cable of sensor 481 runs inside the inner conduit 482 machined in the flange 502. In the integrated stem leak flow-rate, torque and position sensing apparatus 900, the torque is measured by multiple sensors (e.g., the sensors 454, 455, 481) in order to achieve higher resolution and accuracy. For example, higher resolution and accuracy can be provided by comparing measuring the displacement at the sensor 481 against the displacement at the position of sensor 454, as a result of the rotation of the stem 509 caused by the torque applied from the valve actuator.

The hall-effect sensor 455 reads the position by measuring intensity and angle of the magnetic insert 456, which are installed in a cavity drilled on the stem 509. Although FIG. 10A shows only one magnetic insert 456, a plurality of magnetic inserts and hall-effect sensors are required in order to use a single cavity on the actuator flange 450 for measuring position. In this approach, the position sensor 455 detects a combination of magnetic poles facing an array of sensors for every angle of motion as the stem rotates. The torque is determined by measuring the angle and intensity of magnetic flux at working conditions, being the stem rotated under load conditions, against the measurement at rest for a given known load. The calibration process consists in stroking the valve from open and close position at no load conditions (i.e., no fluid passing) while recording the readings of torque at no load conditions at various opening points, next repeating the stroking exercise while applying various loads and finally determining the deviations from no load and loaded conditions along the open-close curve along with hysteresis. The objective of measuring position is to determine the actual position of the valve stem at fully open or fully closed positions rather than measuring position at the actuator level. In large diameter valves the fully open position read by the actuator does not reflect the actual position of the stem, for example the actuator may indicate 100% open but the actual position is 98%. These events can lead to scraper stuck situations and sever damage of the valve seats. The position measurement determines, under static conditions, the actual position of the valve against a previously recorded value of 0% and 100% actual stem position. Thus, the same hall effect sensor will measure the angle and magnetic intensity at actual 0% and 100% in static conditions, and the logic solver will compare it against working conditions having an actual load to determine whether or not the measured position is considered to be, within acceptable and safety margins, a fully open or fully closed position. Another possible embodiment is that the same technique of sensors is placed around the neck body piece around the valve, thus using a plurality of sensors around that piece to measure position at various points around the circumference.

The output cables of the sensors 454, 455, 481 run inside the inner conduits 453, 457, 482, respectively. The threaded connectors 465, 469, 475 connect to the conduit nipples 466, 479, 474, respectively. These sensor cables run into the conduit fitting tees 467, 471, 473, respectively. The tees 467 and 471 are interconnected by the nipples 468, 472. The sensor cables connect to the logic solver 300 enclosure through the conduit 476. The torque and position sensing approach allows improved safety, valve seat performance, and system durability at reduced cost.

The illustrated ball valve includes a valve gland 500 which supports the stem 509, holds stem bearings (i.e., lower stem bearing 459 and upper stem bearing 462), as well as the packing O-rings 458, 460, 497 and the fire proofing gasket ring 461. The flanges 502 and 450 are held in position by studs 484 and nuts 485 around the flanges perimeter spaced at regular intervals. The valve-actuator interface flange is attached to the valve gland 500 by holding bolts 501, while the gland 500 is held to the valve body by bolts 483.

When a leak takes place, fluid passes the O-rings 458, 460 and the fire-proof ring 461. A holding ring (O-ring 497) provides an additional seal to cause the leaking fluid to enter the cavity 464 which connects to the inner drilled conduit 486. The leaking fluid then reaches a threaded connector 487 connecting to a pipe nipple 488 and solenoid valve 489. The solenoid valve 489 is commanded by a cable running inside a conduit fitting tee 490, straight conduit 491 and tee 492. The tee 492 collects signal cables from an electronic rotameter 495 and leads to the conduit 493 towards the logic solver 300 enclosure. The leak flow-rate measurement starts as soon as the fluid enters the rotameter 495, which can be isolated manually by a manual valve 494. The exhaust of the leak is taken to an exhaust pipe 496. A stem key 451 holds the mechanical link to the valve actuator driving coupler, not shown in this figure.

In some integrated stem leak flow-rate, torque and position sensing apparatus, the stem leak flow-rate tapping point 478 is placed on the same side where the torque measurement sensors are installed.

Figure 14:
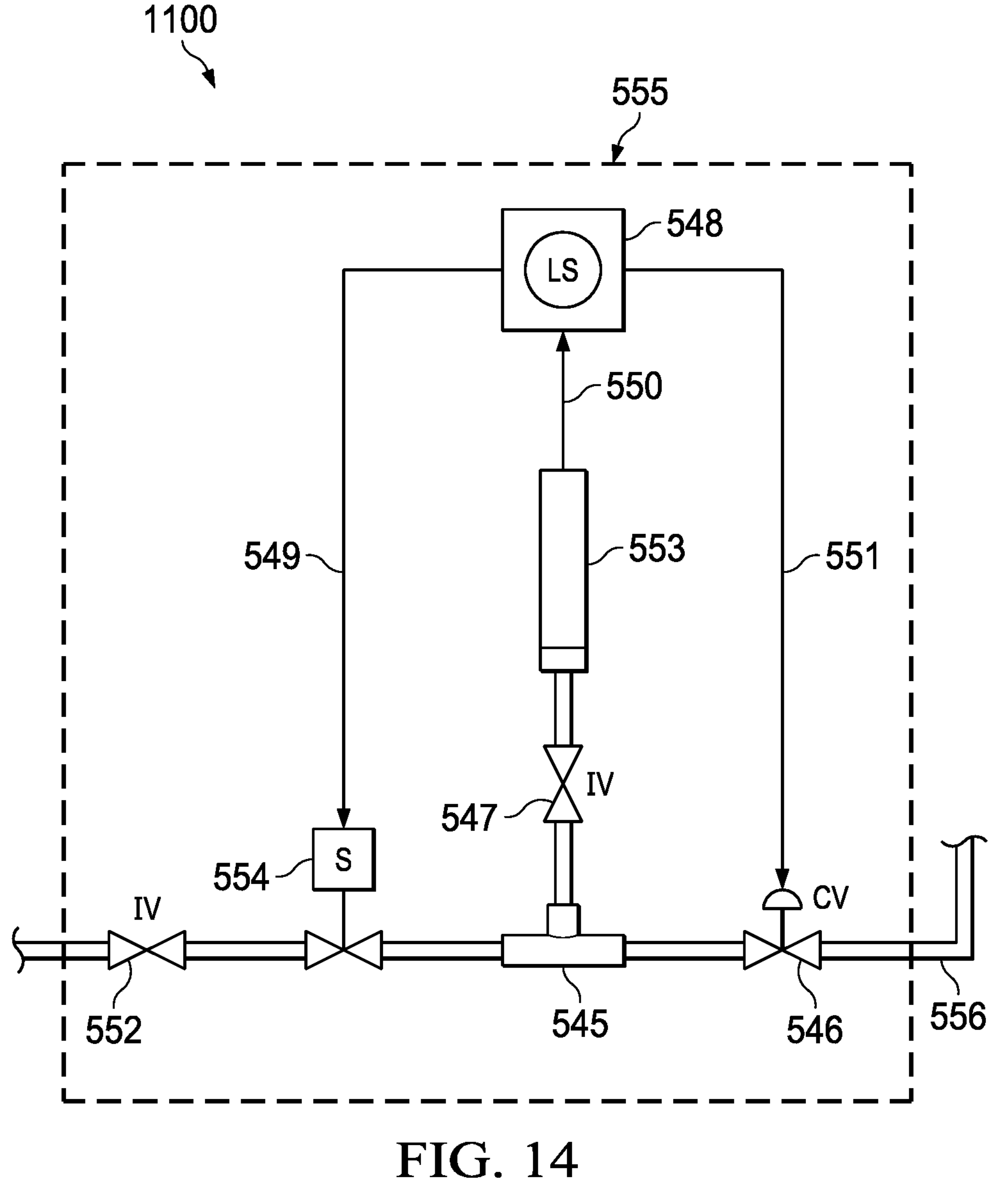
FIG. 14 is a piping and instrument diagram of the steam leak detection and leak flow-rate system shown in FIGS. 13A and 13B.

FIG. 14 shows a piping and instrument diagram of the packing leak flow-rate operation. The stem packing leak flow rate is measured by a rotameter 553 featured with a flow transducer output and an inner pressure transducer that provides a flow-rate signal which is sent over the signal cable 550 to the main logic solver of the system 548. The logic solver 548 can isolate the flow measurement by closing a solenoid valve 554. The leak flow can be also isolated manually by the isolation valve 552. The rotameter 553 is connected to the pipe tee 545 and can be isolated by the valve 547 manually. The exhaust of the leak flow-rate can be regulated by the control valve 546 by the logic solver 548 across the signal cable 551. The valve 546 is a calibrated needle control valve used to estimate very low range of leak flow-rate when the rotameter range is exceeded. In this embodiment, the method of flow rate measurement is achieved by having every signal output from the logic solver 548 calibrated against a percentage of opening of the valve 546 along with the corresponding valve Cv. The flow rate across the valve 546 can be estimated using control valve theory equations based on the upstream valve pressure from the inner pressure transducer of the rotameter 553. In some cases, the entire flow rate measurement assembly is built in a manifold block 555 which provides a main isolation valve 552 to facilitate removal of the entire block 555. The exhaust of the leak is discharged to the atmosphere through the exhaust pipe 556.

Pig Assembly Sensor

FIG. 15 depicts a pig sensor assembly. The pig sensor 531 is a non-intrusive strain measurement sensor comprising a strain gage bonded directly to the valve closure piece body 539 and a transducer circuit contained in the sensor 531 housing. The strain gage is located inside the weld boss 530 inner cavity. The output cables of the strain gage cables connect to the sensor 531 transducer by rotary contact. The sensor 531 is connected by a thread 538 into a weld boss 530, which is directly welded to the valve closure piece body 539. The sensor housing 531 provides a threaded connection 536 for its output signal cables and incoming power cables which come from the logic solver housing. The cables run inside conduit and conduit fitting, namely threaded nipple 533, elbow 534, conduit 535 towards the logic solver housing 300. The pig sensor approach detects localized vibration caused by the passage of the pig as a result of micro-deflections on the pie outer surface caused by the increase of pressure at the rear side of the pig in the direction of the flow and against the pipe wall.

Valve Seat Leakage

FIG. 16 depicts the piping and instrument diagram of a valve seat leak measurement apparatus 406. A mechanical piping 407 to the valve 350 connects to the cavity drain valve 353 to allow the leaked fluid to enter the apparatus for measurement. In some cases, the mechanical piping 407 is a flexible pressure hose. In some cases, the mechanical piping 407 is a rigid pipe. In order to facilitate fast coupling, the quick pipe coupler 354 allows a fast coupling and decoupling of the apparatus from the valve 350. The apparatus 406 connects electrically by a multicore cable 352 to the valve sensor outputs, which are available from the valve sensor retrieval fitting 351 (described in more detail with respect to FIG. 17). At one end, the cable 352 provides an electrically safe connector 405 to facilitate removing the entire apparatus 406 from the valve 350. The connector 405 provides an external grounding cable and connector 409 to ground the apparatus 406 to a valve body ground terminal 413 for embodiments that do not provide shielded flexible couplers or metallic conduit for the cable 352. This approach provides grounding of the apparatus 406 prior coupling and decoupling to the valve sensor retrieval fitting 351. In some cases, the connector 405 with its grounding and connector 409 can directly connect to the valve sensor retrieval fitting 351. In some cases, the cable 352 and connector 405 are installed inside an electrical flexible coupling hose. In some cases, the connector 405 is an explosion proof connector that avoids ignition of the surrounding gases.

Figure 17:
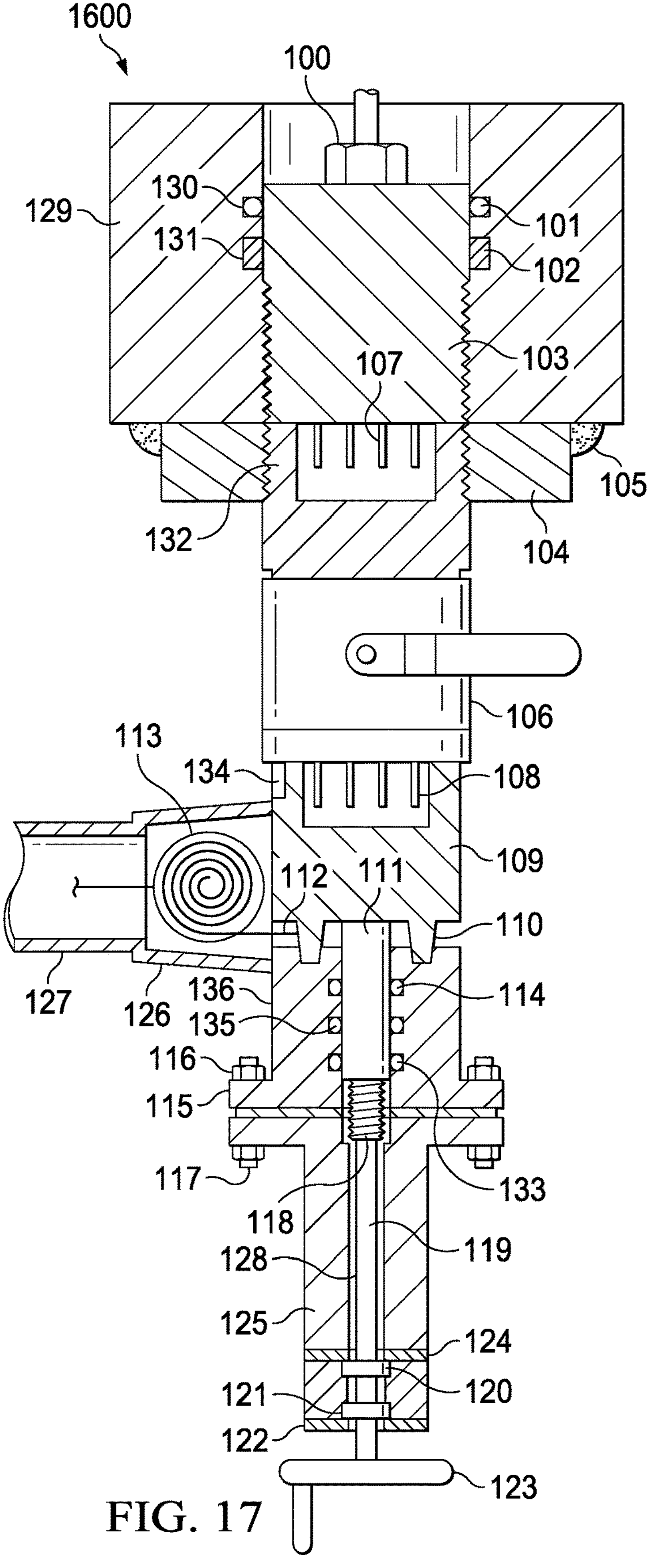
FIG. 17 is a schematic view of the inside valve main cable pressure tight assembly, socket insertion and retrieving mechanism.

FIG. 17 is a cross-section of the valve sensor retrieval fitting 351. The electrical connector 405 and quick pipe coupler 354 allow the apparatus 406 to be operated as a portable tool detached from the valve. The electrical connector 405 provides a grounding cable 409 to ensure a safe connection to the valve to avoid static sparks. The cavity drain valve 353 is normally closed and it connects by a pipe 407 to the quick pipe coupler 354 connected to a fluid inlet line 423.

The apparatus 406 is isolated from the main valve 350 by the isolation valve 355, which is normally closed. The operator opens valve 355 to initiate the leak flow-rate measurement process. The apparatus 406 provides a drain valve 408, which is coupled to the fluid inlet line 423, to depressurize and drain any fluids before disconnecting it from the main valve 350.

The inlet pressure to the apparatus can be read by the operator on the pressure gauge 359. This facilitates quick reading of the inlet pressure before starting the leak flow-rate measurement process. Valve 358 isolates the gauge 359 and valve 360 allows purging the gauge 359 process connection. The inlet pressure signal is transmitted over the signal cable 394 by the pressure indicator transmitter 362 to the apparatus internal logic solver 400. The transmitter 362 is isolated by valve 361 and purged by valve 363. The temperature indicator transmitter 364 transmits the fluid temperature signal over the signal cable 393 to the apparatus internal logic solver 400. The transmitter 364 is isolated from the main header 401 by valve 365. Downstream the valve 367, which is normally closed, isolates the multiple flow elements manifold 410. In some cases, the flow elements consist of three runs with each run providing one orifice plate, 372, 377, 382, to measure low, medium and high leak flow-rates using differential pressure transmitters 369, 373, 378, respectively.by. The transmitters 369, 373, 378 send their individual signals over cables 395, 396, 397, which bundle into a multicore cable 399 to the apparatus internal logic solver 400. In some cases, the manifold 410 includes multiple runs to accommodate intermediate levels of leak flow-rate measurements. In some cases, each differential pressure transmitter 369, 373, 378, is isolated by a pair of valves as illustrated, 370/371, 374/375, and 379/380, respectively. The manifold 410 is isolated from the outlet pipe header 403 by the isolation valve 419 in order to facilitate maintenance works on the manifold and prevent manifold 410 pressurization in the case of utilizing the flushing/bypass line 384. The entire manifold 410 can be removed after closing the valves 367 upstream and downstream 419. The pressure on the outlet header 403 is monitored by the operator on the pressure gauge 386 which is isolated by valve 385 and purged by valve 404. The outlet header is connected to the exhaust pipe 389 sized to accommodate the outlet pressure for the entire range of flow-rates the apparatus handles. In order to manage dirty gaseous or liquid fluids, the apparatus provides a flushing operation mode that the operator executes when selecting flush/bypass mode on the selector switch 416, which provides three operation modes for the apparatus, flushing/by-pass mode, measurement mode and idle mode. The selector switch is connected to the apparatus internal logic solver 400 by the cable 415. The entire apparatus can be shutdown in case of emergency by the emergency push button 418, which is connected to the apparatus internal logic solver 400 by the cable 417. Pushing the emergency push button 418 causes the normally closed solenoid valve 414 to close isolating the entire apparatus from the main valve 350.

At the beginning of the operation of the apparatus, the operator opens valves 355, 366 and 419 to enable operating modes of the apparatus. In flushing/bypass mode, the valves 355 and 366 are already open, the logic solver 400 closes the solenoid valves 411, 368, 376 and 381, then opens the solenoid valves 356 and 387. In measurement mode, the logic solver 400 closes 356, 387 then opens 411 and 368 to start measuring the flow-rate at the lowest measurement range which is provided by the flow element 372.

The logic solver automatically switches over the next measurement run from 420 to 421 and then 422 depending on the flow rate profile measured during a pre-determined amount of time, preselected by the user. The auto switchover prevents cavitation conditions for liquids, freezing of the manifold for highly pressurized gaseous fluids and potential erosion damage of sonic outlet velocities in gaseous fluids and contaminated fluids. The actual flow-rate conditions and damage on the seats of the main valve 350, namely size and extension of the passages on the seat, which are causing the leak to measure, are unknown. It is due to the fluid phenomena associated to releasing fluids through the openings of the apparatus, such as cavitation, freezing and erosion. The seat leak flow rate measurement apparatus provides an automatic flow-rate range selection to prevent damages caused by said phenomena.

The flow-rate for each run, 420, 421 and 422 is calculated by the logic solver from the signals received from each differential pressure transmitter 369, 373 and 378. If the flow-rate exceeds the flow element 372 measurement capacity the logic solver 400 closes 368 and opens 376. If the flow-element 377 capacity is exceeded then the logic solver 400 closes 376 and opens 381. If the flow element capacity 382 is exceeded the logic solver 400 closes the solenoid valve 381 and 414 to safely isolate the apparatus. In order to determine the flow element capacity the logic solver 400 compares the differential pressure curve of the measuring run against a pre-determined differential pressure profile. If the cavity of the main valve 350 remains pressurized after opening the drain valve 353 and initiating measurement mode, which normally takes place due to a sustained leak condition of the seats of valve 350, the differential pressure across the current flow element will follow a predetermined profile that indicates the flow-rate is sustained by the valve 350 cavity pressure, which is normally the pipeline operating pressure.

FIG. 16 also shows various conditions of the calculated flow-rate by the logic solver 400. The upper hashed line shows a large leak flow-rate which is out of range and may cause damage to the seat leak flow rate measurement apparatus. This type of leaks are normally sustained by the pressure in the main valve 350. This occurs when the damage in the seats of valve 350 is permanent. The next three solid lines show sustained leak flow-rates of various ranges which can be measured by said apparatus. The dashed line shows a leak flow-rate of a decaying leak flow-rate, which indicates possible normal (not damaged) conditions of the seat of the main valve (valve 350, FIG. 15).

Referring to FIG. 16, the logic solver 400 can determine the actual leak flow-rate condition for decaying leak profiles. After a predetermined period of time set by the user elapses, the logic solver 400 closes the solenoid valve 411 to cut the flow across the apparatus and then monitors the pressure reading from the pressure transmitter 362. If the pressure on the header 401 measured by 362 remains zero or constantly very low compared to a preset value after another predetermined period of time set by the user, the logic solver 400 writes in its non-volatile memory the valve 350 status as: "normal seat condition".

The logic solver 400 executes a pre-determined routine to select the flow measurement run based on valve design data and by pre-opening the run of smallest flow-rate, which is shown for illustration purposes as line 420 in FIG. 16. If the leak flow-rate is exceeded the logic solver 400 automatically switchover to a larger flow element. The logic solver 400 also determines the direction of the leak flow for each run, from the readings of differential pressure transmitters 369, 372 and 378. The logic solver 400 also compensates the flow calculations for temperature and pressure by receiving the pressure and temperature measurements from pressure indicator transmitter (PIT) 362 and temperature indicator transmitter (TIT) 364, respectively. The logic solver 400 determines the direction of seat leak flow, whether coming from the inlet port or outlet port of the valve 350, by comparing output signals of each seat ring, which is sent to the logic solver 400 by the main logic solver 300 (FIG. 2), with the calculated leak flow rate from the current flow run. The output signals of the seat rings is sent across the cable 425, via the electrical connector 405.

FIG. 17 shows a mechanical drawing of the valve sensor retrieval fitting showing the assembly of the sensors main cables, insertion and retrieval mechanical parts. The inside sensors cable 100 inserts into the sealed threaded plug 103 which is sealed to the body by the O-ring 101 and the fireproof ring 102 that seat inside the groove 130 and 131, respectively. The threaded plug 103 provides a male pin connector array 107 to host the female plug 108. The internal threaded welded boss 105 is welded 105 to the body 129 and hosts the nipple 132, which mechanically connects to the valve 106 of inlet and outlet threaded ports. The female connector 109 is contained in a tee-pipe threaded to the valve 106 on one end and connected by the flange 115 to the flanged pusher stem pipe 125 by studs 117 and nuts 116. The female connector stem 111 is internally threaded 128 to allow the threaded plug 118 to rotate into the internally threaded stem 111 which linearly moves up and down pushing the sensor-output female connector 109 into the plug 103 at the end of its travel. The linear movement of the stem 111 is achieved by the rotation of the drive threaded plug by the rotation of the hand wheel 123 that transmits the motion to the shaft 119. The shaft is held by the bearing 120 which is attached to the plate 124 and the bearing 121 hosted by the cover plate 122, which is bolted to the body of the pusher stem pipe 125.

The stem 111 slides linearly thru the O-ring packing 114, 133 and 135 which are hosted by the pipe packing neck 136 which is machined on the same pipe tee body 126. The cable 112 is coiled by the spring loaded cable reel 113 which allows the cable to slide out and back along with the female connector 109 without suffer damages during the retrieval of the connector 109.

The insertion of the female connector 109 into the male plug 103 is secured by the socket 108. In order to ensure the right alignment of the 108 socket with the plug pins 107, the female connector provides includes a groove 134 which extends into the ball valve threaded connection.

Figure 18:
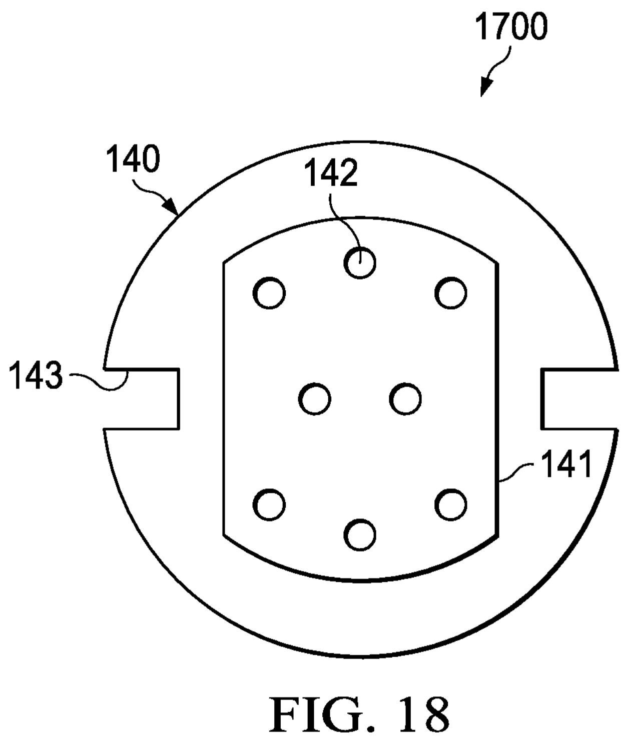
FIG. 18 is a schematic view of the socket sensor-output female connector.

FIG. 18 shows a front view of the female connector 140 with the guiding grooves 143, the socket female walls 141 and female pins 142.

Figure 19:
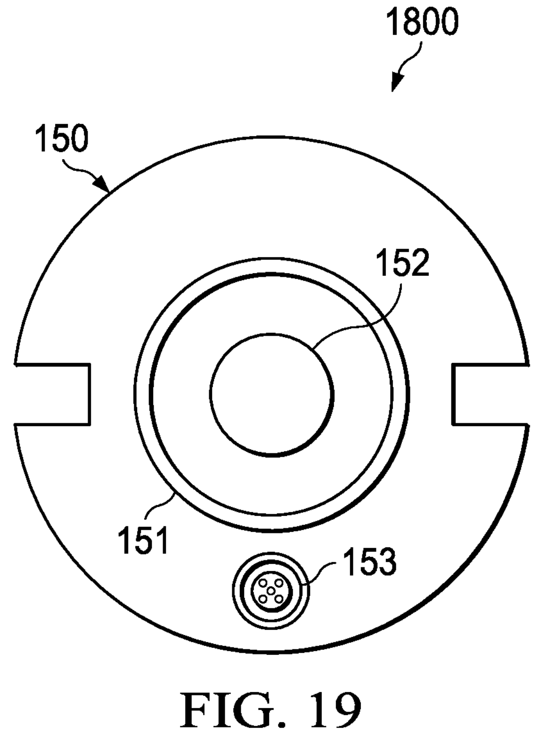
FIG. 19 is a schematic view of the socket sensor-output female connector showing the cable outlet bushing.

FIG. 19 shows a back view of the female connector 150 which is linked to the stem head 152 and the back seat 151 that allows sealing the pipe tee in fully retrieved position of the connector 150 against the pipe tee packing neck 136 (FIG. 17). The cable bushing 153 provides protection to the main sensors cable 112 (FIG. 17).

Figure 20:
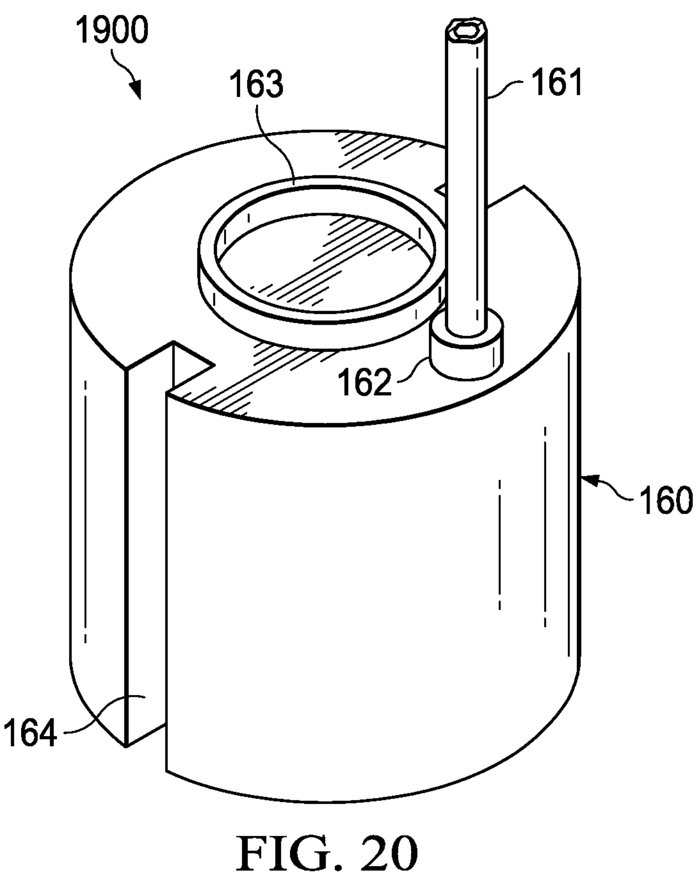
FIG. 20 is an isometric view of the socket sensor-output female connector showing a cable bushing, a cable, and a back metallic back seal ring.

FIG. 20 shows the bushing 162 which provides protection to the cable 161 and guides the cable while moving during both insertion and retrieval of the female connector.

Figure 21:
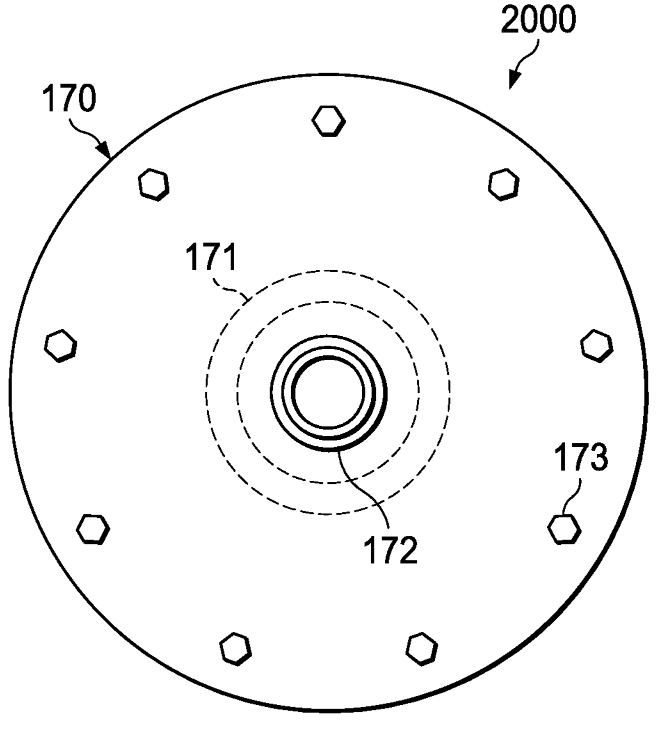
FIG. 21 is a top view of the cover plate of the pusher stem pipe.

FIG. 21 shows the cover 170 of the pusher stem pipe 125. The cover 170 provides mechanical support to the bearing 171 and the O-ring 172 which provides dust and moisture ingress protection from outside environment. The cover 170 is bolted on the pusher stem pipe 125 by bolts 173.

Figure 22:
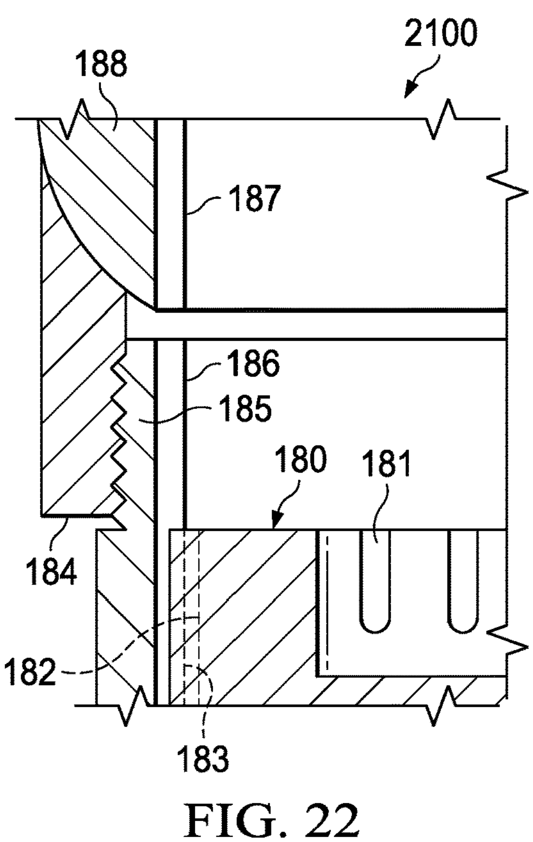
FIG. 22 is a schematic view of the sensor-output female connector inside the valve bore.

FIG. 22 shows the female connector 180 slides as it moves along the guiding key 183 of the threaded pipe tee 185. The movement of the female connector 180 is further guided by the ball valve guiding key 187 attached to the ball valve 188 (FIG. 17, item 106) on the inside bore. This allows the male plug pins 107 to lock into the correct female pin connectors 181.

Figure 23:
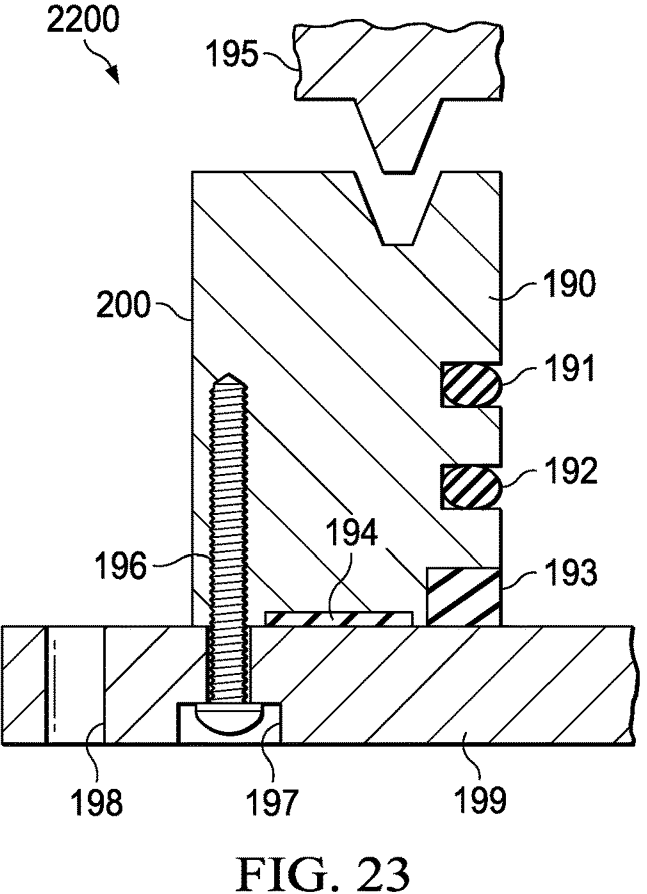
FIG. 23 is a schematic view of the back metal-to-metal seat of the sensor-output female connector.

FIG. 23 shows the O-rings 191, 192 which provide sealing to the sliding stem 111. In some cases, the ring 193 provides fireproof sealing of the entire assembly, depicted above in FIG. 17. The gasket 194 seals the surface contact between the flange 199 and the pipe-tee packing neck 200. The flange 199, already indicated as item 115 in FIG. 17, connects mechanically to the pipe-tee packing neck 200 by a series of screws located along an inner perimeter of 200. One of the screws 196 is shown in FIG. 23. The screw 196 seats its head on the cavity 197. The flange 199 is bolted through the pass-thru hole 198 to the pusher stem pipe flange shown in FIG. 17 and indicated as item 125. The female connector 109 (FIG. 17) and the back ring 195 seat on the pipe-tee neck 190.

Main Body Load Sensor

Figure 24:
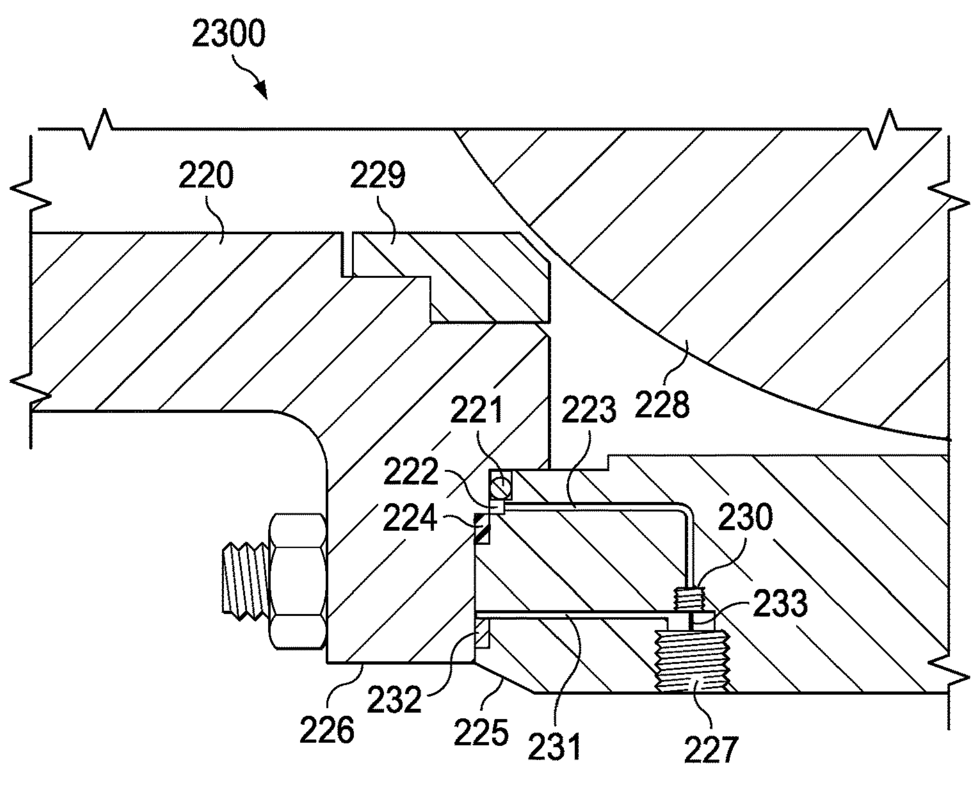
FIG. 24 is a schematic view of the valve body joint leak sensor, body joint load sensor and inner conduits.

FIG. 24 shows the cable of the main body load sensor ring 232 running inside the conduit 231, which is internally machined in the valve body 225. The end of the conduit 231 allows the sensor 232 cables to connect the main cable-sealing plug 227, which also seals the cable of the fluid-sensitive pressure sensor 222. The load sensor 232 radially measures the mechanical load between the closure 226 and the body 225. The internal capillary 223 of the sensor 222 carries the capillary fluid, which is in mechanical contact with the capillary pressure sensor 230. The pressure signal cable 233 of the sensor 230 enters in the cable-sealing plug 227. The body-joint O-ring 221 seals the closure piece 220 and body 225. The fire-safe gasket ring 224 provides further protection to the O-ring 221. The ball 228 seats on the seat ring 229 which is shown in FIG. 24 without cavities. In some cases, the sensor 222 is a fluid-sensitive cable placed on a ring cavity machined on the valve body 225 and the end segments of the fluid sensitive sensor cable 222 enter into the inner conduit 223 to reach the main cable-sealing plug 227 without the need of the capillary pressure sensor 230. In some cases, the fluid sensitive cable is a fiber optic capable of detecting the passage of the leaked fluid, which connects to the logic solver of the present invention to determine the location of the leak across any point around the valve body-closure piece joint circumference by having the logic solver to execute a leak location routine based on light pulse bandwidth scattering reflectometry methods.

Figure 25:
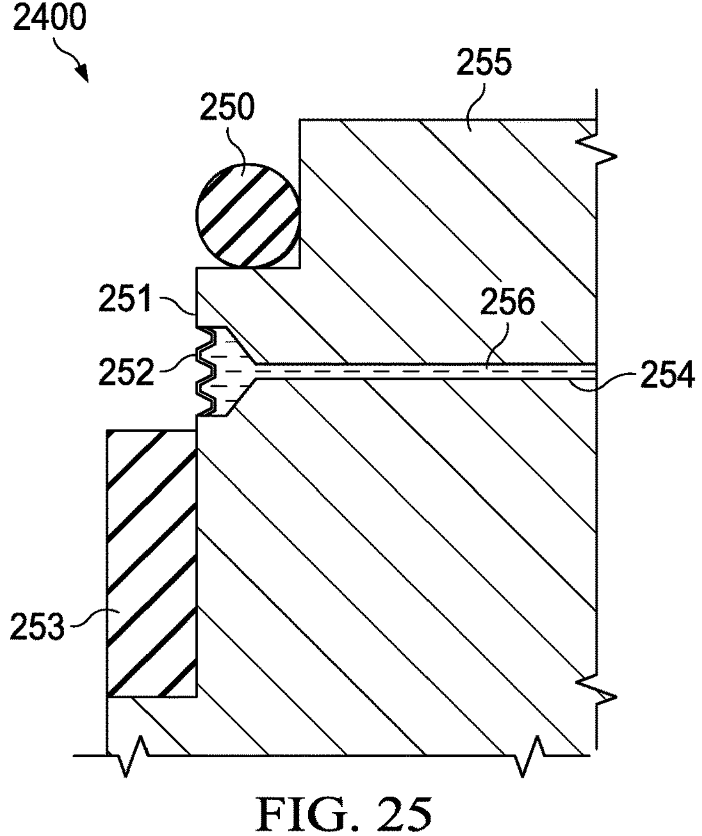
FIG. 25 is a schematic view of the body leak sensor.

FIG. 25 shows one embodiment of the present invention of the sensor 252 which is numbered as 222 in FIG. 24. The sensor diaphragm 252 transmits the pressure measured between the body O-ring 250 and the fire-safe ring 253. When a leak takes place thru the O-ring 250 the pressure built up between the two rings 250, 253, will be measured by the diaphragm 252, which is built to withstand the hydro-test pressure of the valve. The capillary 254 contains the fluid 256 which transmits finally pressure to the pressure sensor 230 (FIG. 24).

Figure 26:
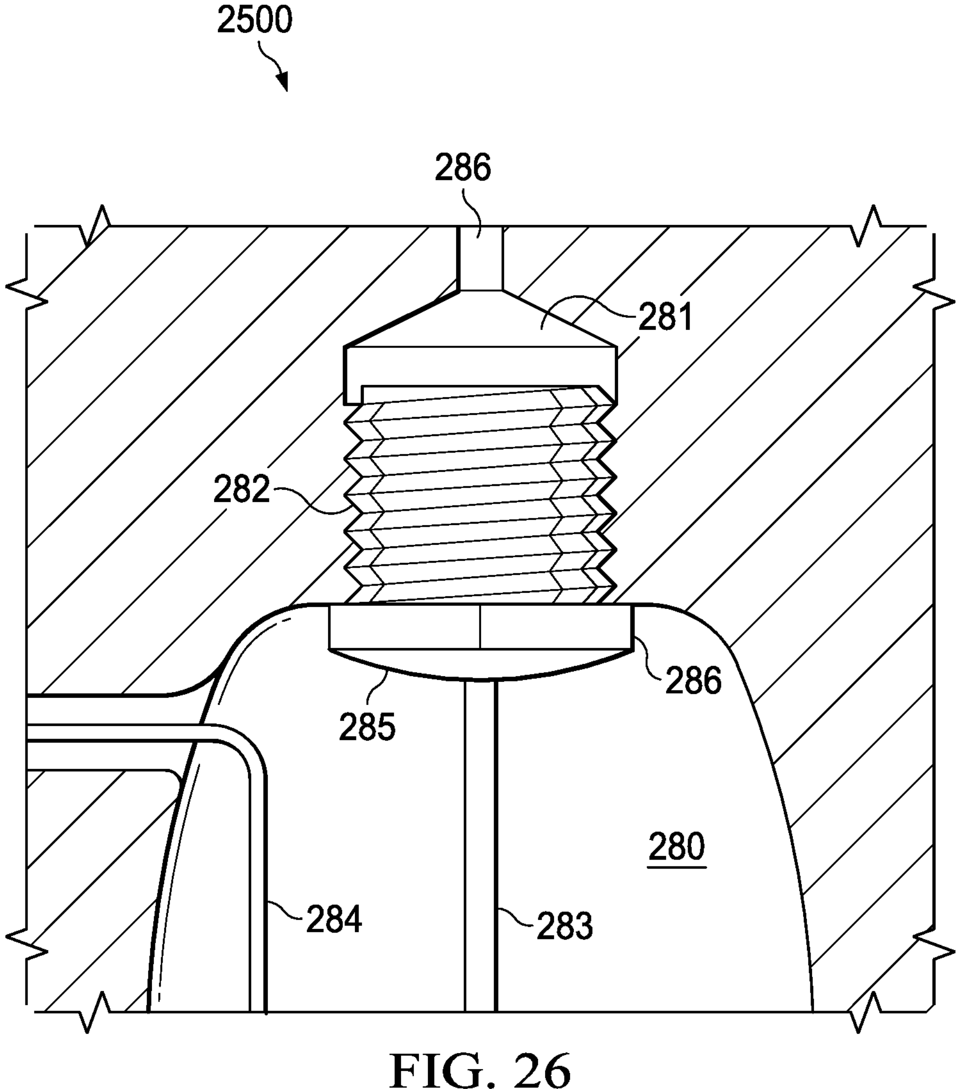
FIG. 26 is a schematic view of the cavity receiving the body leak and load sensors cables.

FIG. 26 the capillary pressure sensor 282 is threaded on the cavity 281, which is found at the end of the capillary 286. The pressure sensor 282 is threaded by turning the nut head 286. The sensor 282 head is sealed by a composite 285 to provide electrical insulation for the sensor output cable 283. The cable 284 of the load sensor 232 (FIG. 23) enters in the cavity 280 which contains the output cables towards the sealing plug 227 (FIG. 23).

Figure 27:
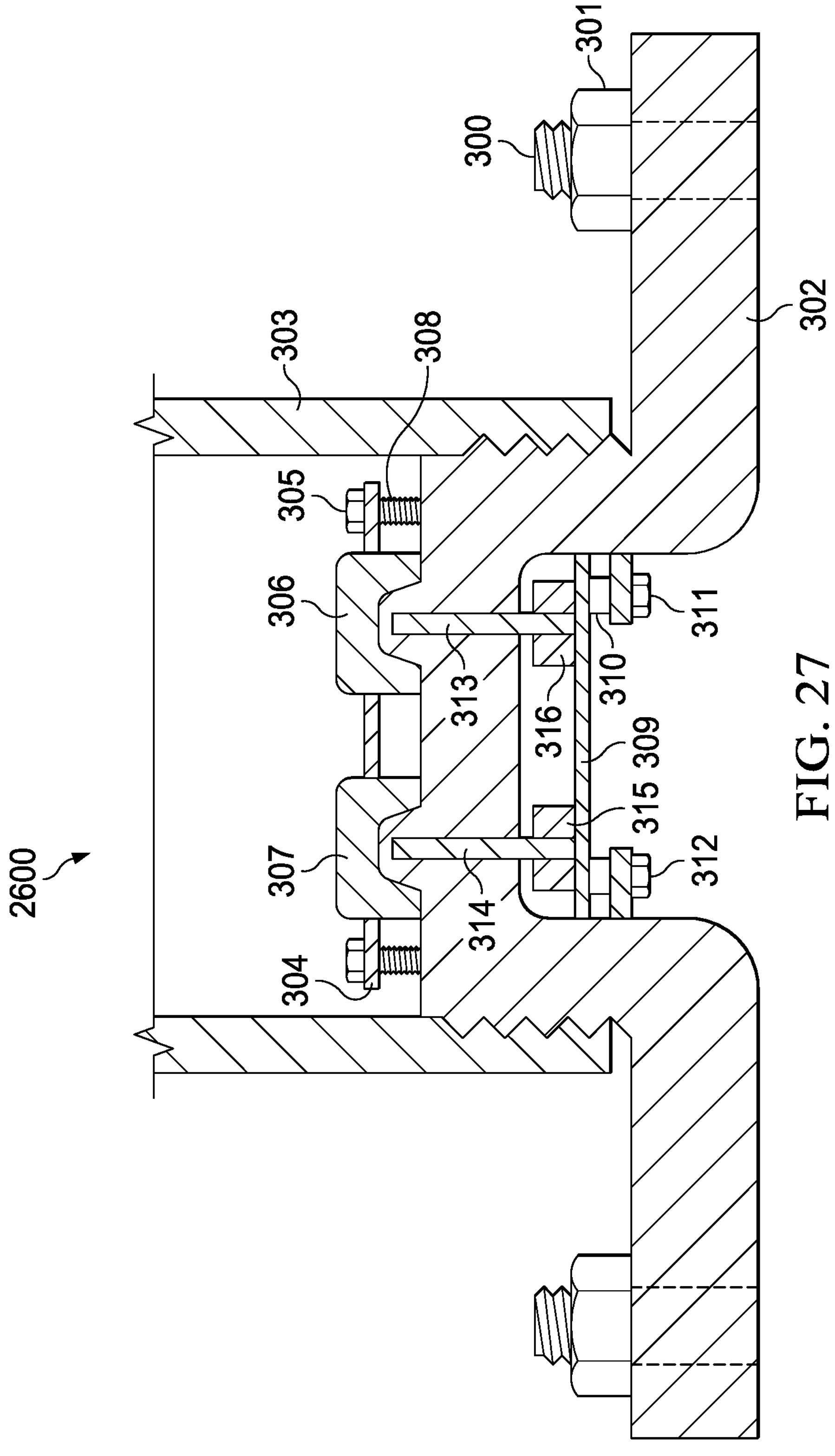
FIG. 27 is a schematic view of the interface isolation flange of inside sensors with the logic solver enclosure.

FIG. 27 shows one embodiment of the interface isolation flange 302 built in a non-ferromagnetic material and bolted to the closure piece body by the bolts 300 and the nut 301. The interface isolation flange 302 provides two magnetic coupling interfaces, one for power by a ferromagnetic nucleus 313 and one for sensor signal 314. The electromagnetic power is received by the coil 316 on the external receiving electronic board 309 and generated by the power-signal main board 304. The sensors signal coil 315 is electromagnetically coupled by the sensor signal nucleus 314 and received by the coil 307 on the main board 304. The external receiving electronic board 309 is mechanically supported by the stand-offs 310 which seat on the ears 312 and securely fastened by the screw 311.

Figure 28:
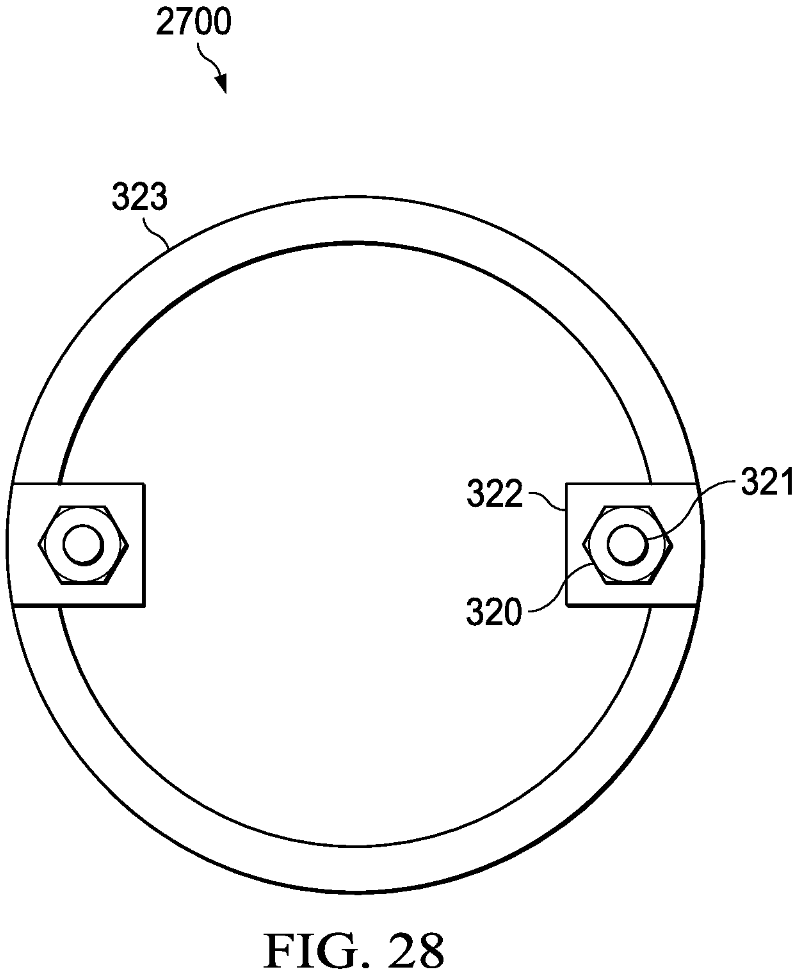
FIG. 28 is a schematic view of the interface isolation flange.

FIG. 28 shows the bottom view of the bore 323 of the interface isolation flange 302 (FIG. 27) and the supporting ears 322, screw 321 and nuts 320 of the external receiving electronic board 309 (FIG. 27). The load sensor detects force imbalance inside that body that can produce leaks.

System Operation

As shown in FIG. 2, the logic solver 300 receives the signals of the system sensors, specifically, seat misalignment sensor 316. In some cases, logic solver 300 also receives signals from the upstream pig sensor 310 and the downstream pig sensor 311. In some cases, the pig passage is detected by a single sensor, the upstream pressure sensor 314, the downstream pressure sensor 315, the seat load sensor 320, the body flange load sensor 312, the body joint seal leak sensor 313, the packing stem leak sensor 319, the valve torque sensor 317, and the valve position sensor 318. The logic solver is configured by the user to provide an alarm whenever any of the sensor inputs deviates from predetermined lo-lo, lo, hi-hi-hi settings. The logic solver has a plurality of comparators for every sensor input. The alarms are stored in the local non-volatile memory and transmitted to the communication port. The logic solver 300 receives and transmits data in the form of configuration parameters, programming logic and set-points from/to an external human-interface data-entry device 309. Similarly, the logic solver 300 communicates with other systems of the same nature as the one disclosed in this specification, through port 306 and hand-held devices through port 304 or wirelessly via the antenna 303. Programming, parameters, set-points and valve and actuator data are stored in a non-volatile memory block 305. The RFID 322 stores relevant data of the valve 331 and the actuator 332, the entire system is represented by function block 333 and the sensors 310, 311, 312, 313, 314, 315, 316, 317, 318, 319 and 320.

In a ball valve, the floating seat is placed in the seat pocket area. The floating seat misalignment shown in FIG. 6 may take place during normal operation of the valve due to entrapment of dirt between the seat pocket area and floating seat. During normal operations, solid particles carried by the fluid passing through the valve are formed behind the seat thus, causing the floating seat to get trapped and to lose its ability to float smoothly against the ball. The seat is not able to seal the ball against the body causing the valve to pass fluid even when is closed. The specification provides method and systems to detect seat misalignment and either to prevent further deterioration of the valve tightness or to manage the seat leak problems that may arise.

Figure 29:
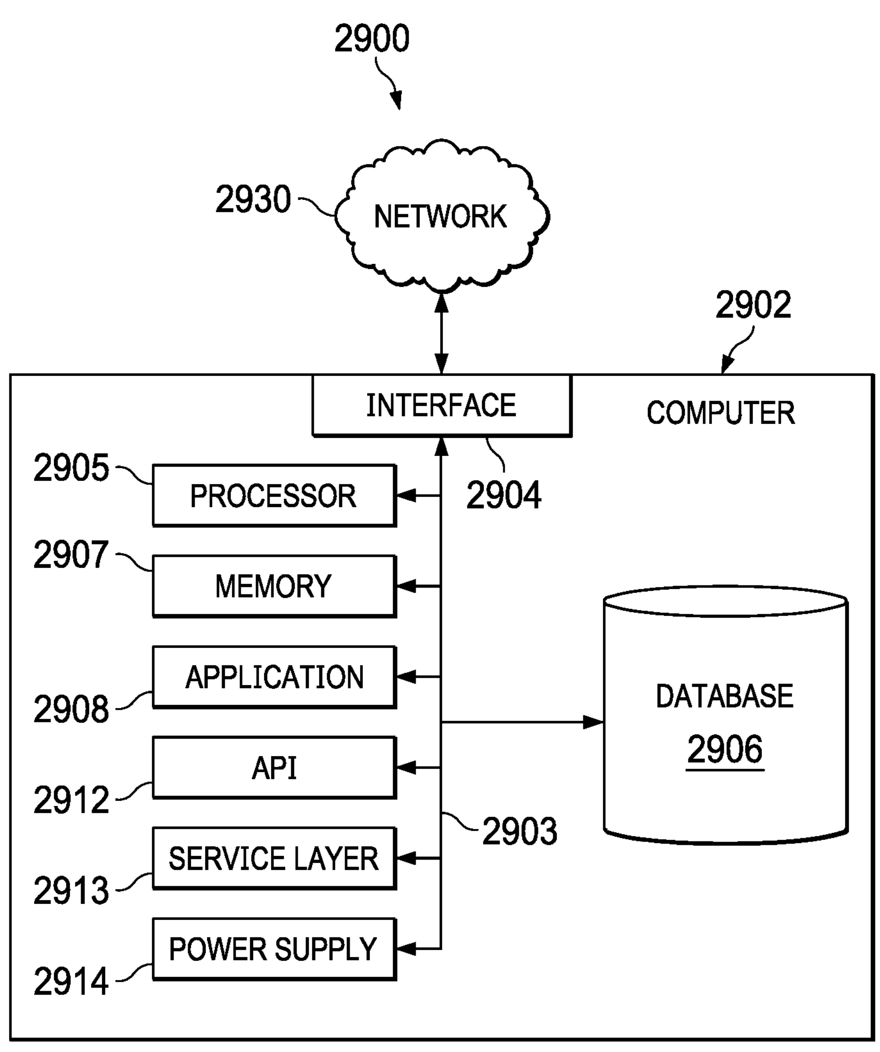
FIG. 29 is schematic block diagram of the data transfer system.

FIG. 29 is a block diagram showing a schematic of a data transfer system 2900. The example of the data transfer system 2900 is used to provide computational functionalities associated with described algorithms, methods, functions, processes, flows, and procedures described in the present disclosure, according to some implementations of the present disclosure. The illustrated computer 2902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2902 can include input devices such as keypads, keyboards, and touch screens that can accept user information. Also, the computer 2902 can include output devices that can convey information associated with the operation of the computer 2902. The information can include digital data, visual data, audio information, or a combination of information. The information can be presented in a graphical user interface (UI) (or GUI).

The computer 2902 can serve in a role as a client, a network component, a server, a database, a persistency, or components of a computer system for performing the subject matter described in the present disclosure. The illustrated computer 2902 is communicably coupled with a network 2930. In some implementations, one or more components of the computer 2902 can be configured to operate within different environments, including cloud-computing-based environments, local environments, global environments, and combinations of environments.

At a high level, the computer 2902 is an electronic computing device operable to receive, transmit, process, store, and manage data and information associated with the described subject matter. According to some implementations, the computer 2902 can also include, or be communicably coupled with, an application server, an email server, a web server, a caching server, a streaming data server, or a combination of servers.

The computer 2902 can receive requests over network 2930 from a client application (for example, executing on another computer). The computer 2902 can respond to the received requests by processing the received requests using software applications. Requests can also be sent to the computer 2902 from internal users (for example, from a command console), external (or third) parties, automated applications, entities, individuals, systems, and computers.

Each of the components of the computer 2902 can communicate using a system bus 2912. In some implementations, any or all of the components of the computer 2902, including hardware or software components, can interface with each other or the interface (or a combination of both), over the system bus 2912. Interfaces can use an application programming interface (API) 2912, a service layer 2913, or a combination of the API 2912 and service layer 2913. The 2912 can include specifications for routines, data structures, and object classes. The API 2912 can be either computer-language independent or dependent. The API 2912 can refer to a complete interface, a single function, or a set of APIs.

The service layer 2913 can provide software services to the computer 2902 and other components (whether illustrated or not) that are communicably coupled to the computer 2902. The functionality of the computer 2902 can be accessible for all service consumers using this service layer 2913. Software services, such as those provided by the service layer 2913, can provide reusable, defined functionalities through a defined interface. For example, the interface can be software written in JAVA, C++, or a language providing data in extensible markup language (XML) format. While illustrated as an integrated component of the computer 2902, in alternative implementations, the API 2912 or the service layer 2913 can be stand-alone components in relation to other components of the computer 2902 and other components communicably coupled to the computer 2902. Moreover, any or all parts of the API 2912 or the service layer 2913 can be implemented as child or sub-modules of another software module, enterprise application, or hardware module without departing from the scope of the present disclosure.

The computer 2902 includes an interface 2904. Although illustrated as a single interface 2904 in FIG. 18, two or more interfaces 2904 can be used according to particular needs, desires, or particular implementations of the computer 2902 and the described functionality. The interface 2904 can be used by the computer 2902 for communicating with other systems that are connected to the network 2930 (whether illustrated or not) in a distributed environment. Generally, the interface 2904 can include, or be implemented using, logic encoded in software or hardware (or a combination of software and hardware) operable to communicate with the network 2930. More specifically, the interface 2904 can include software supporting one or more communication protocols associated with communications. As such, the network 2930 or the interface's hardware can be operable to communicate physical signals within and outside of the illustrated computer 2902.

The computer 2902 includes a processor 2905. Although illustrated as a single processor 2905 in FIG. 29, two or more processors 2905 can be used according to particular needs, desires, or particular implementations of the computer 2902 and the described functionality. Generally, the processor 2905 can execute instructions and can manipulate data to perform the operations of the computer 2902, including operations using algorithms, methods, functions, processes, flows, and procedures as described in the present disclosure.

The computer 2902 also includes a database 2906 that can hold data for the computer 2902 and other components connected to the network 2930 (whether illustrated or not). For example, database 2906 can be an in-memory, conventional, or a database storing data consistent with the present disclosure. In some implementations, database 2906 can be a combination of two or more different database types (for example, hybrid in-memory and conventional databases) according to particular needs, desires, or particular implementations of the computer 2902 and the described functionality. Although illustrated as a single database 2906 in FIG. 18, two or more databases (of the same, different, or combination of types) can be used according to particular needs, desires, or particular implementations of the computer 2902 and the described functionality. While database 2906 is illustrated as an internal component of the computer 2902, in alternative implementations, database 2906 can be external to the computer 2902.

The computer 2902 also includes a memory 2907 that can hold data for the computer 2902 or a combination of components connected to the network 2930 (whether illustrated or not). Memory 2907 can store any data consistent with the present disclosure. In some implementations, memory 2907 can be a combination of two or more different types of memory (for example, a combination of semiconductor and magnetic storage) according to particular needs, desires, or particular implementations of the computer 2902 and the described functionality. Although illustrated as a single memory 2907 in FIG. 29, two or more memories 2907 (of the same, different, or combination of types) can be used according to particular needs, desires, or particular implementations of the computer 2902 and the described functionality. While memory 2907 is illustrated as an internal component of the computer 2902, in alternative implementations, memory 2907 can be external to the computer 2902.

The application 2908 can be an algorithmic software engine providing functionality according to particular needs, desires, or particular implementations of the computer 2902 and the described functionality. For example, application 2908 can serve as one or more components, modules, or applications. Further, although illustrated as a single application 2908, the application 2908 can be implemented as multiple applications 2908 on the computer 2902. In addition, although illustrated as internal to the computer 2902, in alternative implementations, the application 2908 can be external to the computer 2902.

The computer 2902 can also include a power supply 2914. The power supply 2914 can include a rechargeable or non-rechargeable battery that can be configured to be either user- or non-user-replaceable. In some implementations, the power supply 2914 can include power-conversion and management circuits, including recharging, standby, and power management functionalities. In some implementations, the power-supply 2914 can include a power plug to allow the computer 2902 to be plugged into a wall socket or a power source to, for example, power the computer 2902 or recharge a rechargeable battery.

There can be any number of computers 2902 associated with, or external to, a computer system containing computer 2902, with each computer 2902 communicating over network 2930. Further, the terms "client," "user," and other appropriate terminology can be used interchangeably, as appropriate, without departing from the scope of the present disclosure. Moreover, the present disclosure contemplates that many users can use one computer 2902 and one user can use multiple computers.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A multi-piece ball valve comprising:

a body;

a first closure piece attached to the body, the first closure piece and the body together defining an interior cavity;

a ball disposed in the interior cavity, the ball defining a bore extending through the ball;

a load sensor ring disposed in an annular cavity defined in an outer surface of the body between the body and the first closure piece;

a pressure sensor operable to sense fluid pressure between the body and the first closure piece; and an electronic control system in communication with the load sensor ring and the pressure sensor, wherein the electronic control system is operable to determine a location of a leak across any point around a valve body-closure piece joint circumference by having a logic solver executing a leak location routine based on light pulse bandwidth scattering reflectometry methods.

2. The multi-piece ball valve of claim 1, wherein a first conduit machined in the body extends between the interior cavity defined in the outer surface of the body and a cable sealing plug.

3. The multi-piece ball valve of claim 2, wherein the pressure sensor comprises a fluid-sensitive cable placed on a ring cavity machined on the body and end segments of the fluid-sensitive cable extending through a second conduit to the cable sealing plug.

4. The multi-piece ball valve of claim 3, wherein the fluid sensitive cable comprises a fiber optic cable capable of detecting a passage of a leaked fluid.

5. The multi-piece ball valve of claim 1, wherein the multi-piece ball valve is a three-piece ball valve further comprising a second closure piece.

6. The multi-piece ball valve of claim 5, wherein the pressure sensor comprises a fluid-sensitive cable placed on a ring cavity machined on the body and end segments of the fluid-sensitive cable extending through a second conduit to the cable sealing plug.

7. The multi-piece ball valve of claim 6, wherein the fluid sensitive cable comprises a fiber optic cable capable of detecting a passage of a leaked fluid.

8. The multi-piece ball valve of claim 1, wherein the load sensor ring radially measures a mechanical load between the body and the first closure piece.

9. The multi-piece ball valve of claim 8, wherein the pressure sensor comprises a fluid-sensitive cable placed on a ring cavity machined on the body and end segments of the fluid-sensitive sensor cable extending through a second conduit to the cable sealing plug.

10. The multi-piece ball valve of claim 9, wherein the fluid sensitive cable comprises a fiber optic cable capable of detecting a passage of a leaked fluid.

11. The multi-piece ball valve of claim 10, wherein the electronic control system is operable to determine a location of a leak across any point around a valve body-closure piece joint circumference by having a logic solver to execute a leak location routine based on light pulse bandwidth scattering reflectometry methods.

12. A ball valve comprising:

a body comprising an outer surface;

a first closure piece attached to the body, the first closure piece and the body together defining an interior cavity and an annular cavity, the annular cavity defined in part by the outer surface of the body;

a ball disposed in the interior cavity, the ball defining a bore extending through the ball;

a load sensor ring disposed in the annular cavity;

a pressure sensor operable to sense fluid pressure between the body and the first closure piece; and an electronic control system in communication with the load sensor ring and the pressure sensor, the electronic control system comprising a logic solver that is configured to monitor and control the load sensor ring and the pressure sensor to determine a location of a leak across any point around a valve body-closure piece joint circumference based on light pulse bandwidth scattering reflectometry methods.

13. The ball valve of claim 12, wherein the logic solver is configured to execute a leak location routine based on light pulse bandwidth scattering reflectometry methods.

* * * * *